United States Patent
Ranta et al.

(10) Patent No.: US 12,231,094 B2
(45) Date of Patent: Feb. 18, 2025

(54) SYSTEMS AND METHODS FOR DEVICE SPECIFICATION DESIGN AND VERIFICATION BY ERROR VECTOR MAGNITUDE PREDICTION

(71) Applicant: pSemi Corporation, San Diego, CA (US)

(72) Inventors: Tero Ranta, San Diego, CA (US); Marc Facchini, San Diego, CA (US); Peter Bacon, Derry, NH (US); Allen Groenke, San Diego, CA (US)

(73) Assignee: PSEMI CORPORATION, San Diego, CA (US)

( * ) Notice: Subject to any disclaimer, the term of this patent is extended or adjusted under 35 U.S.C. 154(b) by 309 days.

(21) Appl. No.: 17/539,990

(22) Filed: Dec. 1, 2021

(65) Prior Publication Data

US 2022/0173703 A1     Jun. 2, 2022

Related U.S. Application Data

(60) Provisional application No. 63/120,104, filed on Dec. 1, 2020.

(51) Int. Cl.
   *H03F 1/32*               (2006.01)
   *G06F 30/20*              (2020.01)
   *H03G 3/20*               (2006.01)

(52) U.S. Cl.
CPC .......... *H03F 1/3241* (2013.01); *G06F 30/20* (2020.01); *H03G 3/20* (2013.01)

(58) Field of Classification Search
CPC .................................................. H03F 1/3241
See application file for complete search history.

(56) References Cited

U.S. PATENT DOCUMENTS

| | | | |
|---|---|---|---|
| 8,111,776 B1* | 2/2012 | Crawford | H04L 27/361 |
| | | | 375/295 |
| 10,845,401 B2 | 11/2020 | Verspecht et al. | |
| 11,121,784 B2 | 9/2021 | Dunsmore et al. | |
| 2007/0201575 A1* | 8/2007 | Ariyavisitakul | H04L 1/0631 |
| | | | 375/267 |

OTHER PUBLICATIONS

El-Hassan, M., et al., "EVM Closed-Form Expression for OFDM Signals With Tone Reservation-Based PAPR Reduction," *IEEE Transactions on Wireless , Institute of Electrical and Electronics Engineers*, 2020, 19 (4), pp. 2352-2366. 15 Pages. 10.1109/TWC.2020.2964196. hal-02925159.
Faraclas, E.W., "Testing the Limits Of IEEE 802.11ac," Microwaves & RF. Jul. 31, 2013. 5 Pages. Available online from https://www.mwrf.com/technologies/test-measurement-analyzers/article/21845228/testing-the-limits-of-ieee-80211ac.
International search Report and Written Opinion for International PCT Application No. PCT/US2021/061444 filed on Dec. 1, 2021, on behalf of pSemi Corporation. Mail Date: Jul. 14, 2022. 23 Pages.
Invitation to Pay additional fees, Partial Sear Report, and Provisional Opinion issued for International PCT Application No. PCT/US2021/061444 filed on Dec. 1, 2021, on behalf of pSemi Corporation. Mail Date: Apr. 5, 2022. 14 Pages.

* cited by examiner

*Primary Examiner* — Hsinchun Liao
(74) *Attorney, Agent, or Firm* — Steinfl + Bruno LLP

(57) ABSTRACT

Methods and systems for determining the error vector magnitudes for an RF device by fitting voltage magnitudes to a Rayleigh distribution to produce weighting parameters for an EVM calculation, either in simulation for designing the RF device or as validation measurements from a physical RF device.

24 Claims, 31 Drawing Sheets

| Input voltage | | Output voltage | | Beta scaling factor | | | | Scaled output | | Error Vectors | | Squared |
|---|---|---|---|---|---|---|---|---|---|---|---|---|
| x | | y | | conj(x)*y | | conj(x)*x | | (1/beta)*y | | err=(1/beta)*y-x | | abs(err)^2 |
| Real | Imag | Real | Imag | Real | Imag | Real | Imag | Real | Imag | Real | Imag | Real |
| -1.000 | -1.000 | 2.570 | -1.814 | -0.755 | 4.384 | 2.000 | 0.000 | -0.980 | -0.815 | 0.020 | 0.185 | 0.03467 |
| -1.000 | -0.333 | 1.655 | -2.250 | -0.905 | 2.801 | 1.111 | 0.000 | -1.054 | -0.411 | -0.054 | -0.078 | 0.00900 |
| -1.000 | 0.333 | -0.026 | -2.793 | -0.905 | 2.801 | 1.111 | 0.000 | -1.090 | 0.304 | -0.090 | -0.030 | 0.00900 |
| -1.000 | 1.000 | -1.814 | -2.570 | -0.755 | 4.384 | 2.000 | 0.000 | -0.815 | 0.980 | 0.185 | -0.020 | 0.03467 |
| -0.333 | -1.000 | 2.793 | -0.026 | -0.905 | 2.801 | 1.111 | 0.000 | -0.304 | -1.090 | 0.030 | -0.090 | 0.00900 |
| -0.333 | -0.333 | 1.330 | -0.491 | -0.280 | 0.607 | 0.222 | 0.000 | -0.332 | -0.469 | 0.001 | -0.136 | 0.01841 |
| -0.333 | 0.333 | -0.491 | -1.330 | -0.280 | 0.607 | 0.222 | 0.000 | -0.469 | 0.332 | -0.136 | -0.001 | 0.01841 |
| -0.333 | 1.000 | -2.250 | -1.655 | -0.905 | 2.801 | 1.111 | 0.000 | -0.411 | 1.054 | -0.078 | 0.054 | 0.00900 |
| 0.333 | -1.000 | 2.250 | 1.655 | -0.905 | 2.801 | 1.111 | 0.000 | 0.411 | -1.054 | 0.078 | -0.054 | 0.00900 |
| 0.333 | -0.333 | 0.491 | 1.330 | -0.280 | 0.607 | 0.222 | 0.000 | 0.469 | -0.332 | 0.136 | 0.001 | 0.01841 |
| 0.333 | 0.333 | -1.330 | 0.491 | -0.280 | 0.607 | 0.222 | 0.000 | 0.332 | 0.469 | -0.001 | 0.136 | 0.01841 |
| 0.333 | 1.000 | -2.793 | 0.026 | -0.905 | 2.801 | 1.111 | 0.000 | 0.304 | 1.090 | -0.030 | 0.090 | 0.00900 |
| 1.000 | -1.000 | 1.814 | 2.570 | -0.755 | 4.384 | 2.000 | 0.000 | 0.815 | -0.980 | -0.185 | 0.020 | 0.03467 |
| 1.000 | -0.333 | 0.026 | 2.793 | -0.905 | 2.801 | 1.111 | 0.000 | 1.090 | -0.304 | 0.090 | 0.030 | 0.00900 |
| 1.000 | 0.333 | -1.655 | 2.250 | -0.905 | 2.801 | 1.111 | 0.000 | 1.054 | 0.411 | 0.054 | 0.078 | 0.00900 |
| 1.000 | 1.000 | -2.570 | 1.814 | -0.755 | 4.384 | 2.000 | 0.000 | 0.980 | 0.815 | -0.020 | -0.185 | 0.03467 |
| | | | SUM | -11.379 | 42.376 | 17.778 | 0.000 | | | | ErrPwr = mean(abs(err)^2) | 0.01777 |
| | | | | beta=sum(conj(x)*y)/sum(conj(x)*x) | | -0.640 | 2.384 | | | | RefPwr = mean(abs(x)^2) | 1.111 |
| | | | | | | | | | | | EVM=10*log10(ErrPwr/RefPwr) | -17.96 |

FIG. 12

4 SYMBOL STATES

16 SYMBOL STATES

SYSTEMS AND METHODS FOR DEVICE SPECIFICATION DESIGN AND VERIFICATION BY ERROR VECTOR MAGNITUDE PREDICTION

CROSS-REFERENCE TO RELATED APPLICATIONS

This application claims priority to U.S. Provisional Application No. 63/120,104 filed on Dec. 1, 2020, titled "SYSTEMS AND METHODS FOR DEVICE SPECIFICATION VERIFICATION BY ERROR VECTOR MAGNITUDE PREDICTION", the contents of which are incorporated by reference in its entirety herein.

BACKGROUND

(1) Technical Field

The disclosure relates to verifying that a digital transmission device/system meets specification requirements by using error vector magnitude (EVM) simulation/calculation or measurement, such as for devices/systems using orthogonal frequency-division multiplexing (OFDM). Specifically, it relates to estimating EVMs from measured or simulated amplitude and phase changes for such devices/systems.

(2) Background

A method of coding symbols (e.g., binary code symbols) into a transmitted signal is OFDM or the equivalent. The system uses combinations of magnitude and/or phase differences (subcarriers) in the transmitted signal to differentiate between the symbols. An example is 802.11a/g which uses 48 different subcarriers. These subcarriers can be mapped on an IQ (In-phase/Quadrature) constellation, which shows where the symbols fall on a two-dimensional graph of two orthogonal signal components—the in-phase signal component and the quadrature signal component.

In some situations, a signal may become distorted (e.g., due to noise, non-linearity distortion, carrier leakage, etc.) from the original signal such that the measured symbol for a subcarrier is offset (distorted) on the constellation from where the original (ideal) symbol should be located. This could lead to symbols being misread and the data being corrupted. Therefore, predicting the amount of error under operating conditions is critical for designing devices that transmit coded RF (radio frequency) signals, such as RF power amplifiers.

While some devices have outputs with amplitude and phase in a mainly linear relationship to the input at relatively low input amplitudes, at higher levels the device will eventually reach saturation (being driven into compression) and the output amplitude and phase begin having non-linear distortions. An example shown in FIG. 1, showing the non-linear behavior of the gain (10) and the phase shift (20) in the region of compression/saturation (30). While linear changes are either expected (e.g., gain) or don't have an impact on the delivered signal (e.g., constant phase change is just equivalent to a delay in the signal), non-linear distortions are typically undesirable. Device designs typically have specified tolerance metrics and benchmarks for simulating or measuring how much non-linear distortion the actual output has relative to the ideal output in the absence of non-linear distortions within an operating range. For RF devices, predicting/measuring the error vector magnitude based on ideal and distorted IQ constellation points can determine if the device falls within the specification's tolerance.

An error vector magnitude (EVM) is defined as the mean (average) of squared distances between ideal and distorted IQ constellation points, divided by the average power of ideal constellation. Thus, it represents the ratio between "average error power" and "average constellation power" and is usually expressed as percentage or dBm. An example is shown in FIG. 2, where the error vector (110) from an ideal symbol (120) to the measurement (distorted) symbol (130) is shown on an IQ constellation in the 2-dimensional I-Q plane for a 16 QAM (16 constellation point, quadrature amplitude modulation) signal.

A known method for error determination for a power amplifier is by transient simulation (for example, the Circuit Envelope approach), where an actual modulated signal is applied to an input of the power amplifier and the distorted output signal is externally post-processed (e.g., via Matlab®) and demodulated using an actual demodulator prior to EVM calculation, which can take time in the order of around an hour to complete. In addition, the EVM results may be sensitive to simulator's convergence issues related to power amplifier's compression and saturation operation states.

SUMMARY

The systems and methods presented herein provide for an accurate, but fast, EVM prediction which is 1) insensitive to any convergence issues related to power amplifier compression and saturation operating states, 2) based on a single-tone harmonic balance AM-AM/PM power sweep (input/output) simulation, 3) based on the statistics of the modulated IQ waveform to represent the waveform, instead of the actual time-domain waveform itself, and 4) able to be performed within the simulator itself without the need for an external post-processing step. The fast method can be used for rapid (designing and validating in real-time, taking seconds or minutes, instead of an hour or more as the traditional circuit envelope method did) design and validation of devices, in particular for RF cellular and WiFi devices, such as power amplifiers.

In a first aspect a computer-implemented method for designing an RF device is disclosed, comprising: modelling a current design of the RF device as a model device in a simulator; applying a simulated input power sweep on the model device; measuring, by a processor, an output sweep of amplitudes for the model device in response to the simulated input power sweep; calculating, by a processor, a parameter of a statistical distribution based on an modulation scheme for the RF device; computing, by a processor, error vector magnitude values versus output power based on the input sweep, output sweep, and the statistical distribution; determining, by a processor, if the RF device is within a specified tolerance based on the error vector magnitude values; and adjusting the current design of the RF device based on the determining.

In a second aspect a method is disclosed, comprising: applying an input power sweep on an RF device; measuring an output sweep of amplitudes on the RF device; calculating, by a processor, a statistical distribution of the input sweep; computing, by a processor, error vector magnitude values based on the input sweep, output sweep, and statistical distribution; determining, by a processor, if the RF device is within a specified tolerance based on the error vector magnitude values; and adjusting the RF device based on the determining.

In a third aspect, a wireless communication device is disclosed comprising: an amplifier that receives input signals and produces a corresponding output signals; signal generating circuitry operatively coupled to an input of the amplifier, the signal generating circuitry producing input signals received by the amplifier; circuitry operatively coupled to the signal generator and the amplifier, wherein the circuitry comprises one or more processors and a non-transitory computer readable medium storing one or more instruction sets, wherein the one or more instruction sets include instructions configured to be executed by the one or more processors to cause the device to: provide a first input signal to the amplifier, the first input signal having a plurality of input sweep amplitudes; measure a plurality of output sweep amplitudes and phase angles in a corresponding output signal produced by the amplifier; calculate a statistical distribution of the input sweep amplitudes; calculate error vector magnitude values based on the input sweep amplitudes, the output sweep amplitudes, and the statistical distribution; calculate an amplitude predistortion and a phase predistortion based on the calculated error vector magnitude values; and provide a predistorted signal to the input of the amplifier.

In a fourth aspect, a wireless communication device is disclosed comprising: an amplifier that receives input signals and produces a corresponding output signals; signal generating circuitry operatively coupled to an input of the amplifier, the signal generating circuitry producing input signals received by the amplifier; circuitry operatively coupled to the signal generator and the amplifier, wherein the circuitry comprises one or more processors and a non-transitory computer readable medium storing one or more instruction sets, wherein the one or more instruction sets include instructions configured to be executed by the one or more processors to cause the device to: provide a first input signal to the amplifier, the first input signal having a plurality of input sweep amplitudes; measure a plurality of output sweep amplitudes and phase angles in a corresponding output signal produced by the amplifier; calculate a statistical distribution of the input sweep amplitudes; calculate error vector magnitude values based on the input sweep amplitudes, the output sweep amplitudes, and the statistical distribution; and vary amplifier control signals or parameters or both based on the calculated error vector magnitude values.

In a fifth aspect, a wireless communication device is disclosed comprising: an amplifier that receives input signals and produces a corresponding output signals; signal generating circuitry operatively coupled to an input of the amplifier, the signal generating circuitry producing input signals received by the amplifier; circuitry operatively coupled to the signal generator and the amplifier, wherein the circuitry comprises one or more processors and a non-transitory computer readable medium storing one or more instruction sets, wherein the one or more instruction sets include instructions configured to be executed by the one or more processors to cause the device to: provide a first input signal to the amplifier, the first input signal having a plurality of input sweep amplitudes; measure a plurality of output sweep amplitudes and phase angles in a corresponding output signal produced by the amplifier; calculate a statistical distribution of the input sweep amplitudes; calculate error vector magnitude values based on the input sweep amplitudes, the output sweep amplitudes, and the statistical distribution; select a modulation scheme based on the calculated error vector magnitude values; and provide a second signal to the input of the amplifier, the second signal being modulated in accordance with the selected modulation scheme.

In a sixth aspect, a wireless communication device is disclosed comprising: an amplifier that receives input signals and produces a corresponding output signals; signal generating circuitry operatively coupled to an input of the amplifier, the signal generating circuitry producing input signals received by the amplifier; circuitry operatively coupled to the signal generator and the amplifier, wherein the circuitry comprises one or more processors and a non-transitory computer readable medium storing one or more instruction sets, wherein the one or more instruction sets include instructions configured to be executed by the one or more processors to cause the device to: provide a first input signal to the amplifier, the first input signal having a plurality of input sweep amplitudes; measure a plurality of output sweep amplitudes and phase angles in a corresponding output signal produced by the amplifier; calculate a statistical distribution of the input sweep amplitudes; calculate error vector magnitude values based on the input sweep amplitudes, the output sweep amplitudes, and the statistical distribution; select a peak-to-average power ratio (PAPR) based on the calculated error vector magnitude values; and provide a second signal to the input of the amplifier, the second signal having the selected PAPR.

In a seventh aspect, a wireless communication device is disclosed comprising: an amplifier that receives input signals and produces a corresponding output signals; signal generating circuitry operatively coupled to an input of the amplifier, the signal generating circuitry producing input signals received by the amplifier; circuitry operatively coupled to the signal generator and the amplifier, wherein the circuitry comprises one or more processors and a non-transitory computer readable medium storing one or more instruction sets, wherein the one or more instruction sets include instructions configured to be executed by the one or more processors to cause the device to: provide a first input signal to the amplifier, the first input signal having a plurality of input sweep amplitudes; measure a plurality of output sweep amplitudes and phase angles in a corresponding output signal produced by the amplifier; calculate a statistical distribution of the input sweep amplitudes; calculate error vector magnitude values based on the input sweep amplitudes, the output sweep amplitudes, and the statistical distribution; select a bandwidth based on the calculated error vector magnitude values; and provide a second signal to the input of the amplifier, the second signal having the selected bandwidth.

In an eighth aspect, an RF device designed by any other aspect is disclosed.

In a ninth aspect, a system configured to carry out the steps of any other aspect is disclosed.

In a tenth aspect, a non-transient computer readable medium containing data that, when read by a computer, carry out the steps of any of any other aspect is disclosed.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 6A shows the gain vs. output power. FIG. 6B shows the phase vs. output power. FIG. 6C shows estimated EVM characteristics calculated from amplitude (FIG. 6A) and phase (FIG. 6B) data and a tolerance zone defined according to an embodiment.

FIG. 7A shows the gain vs. output power. FIG. 7B shows the phase vs. output power. FIG. 7C shows estimated EVM characteristics calculated from amplitude (FIG. 7A) and phase (FIG. 7B) data.

FIG. 8A shows the gain vs. output power. FIG. 8B shows the phase vs. output power. FIG. 8C shows estimated EVM characteristics calculated from amplitude (FIG. 8A) and phase (FIG. 8B) data.

FIG. 9A shows the gain vs. output power. FIG. 9B shows the phase vs. output power. FIG. 9C shows estimated EVM characteristics calculated from amplitude (FIG. 9A) and phase (FIG. 9B) data.

FIG. 10A shows an example at a Zload of 50 ohms; FIG. 10B shows an example at a Zload of 17+j18 ohms.

FIG. 12 shows a table of example values produced by an embodiment of the method.

DETAILED DESCRIPTION

Figure 1:
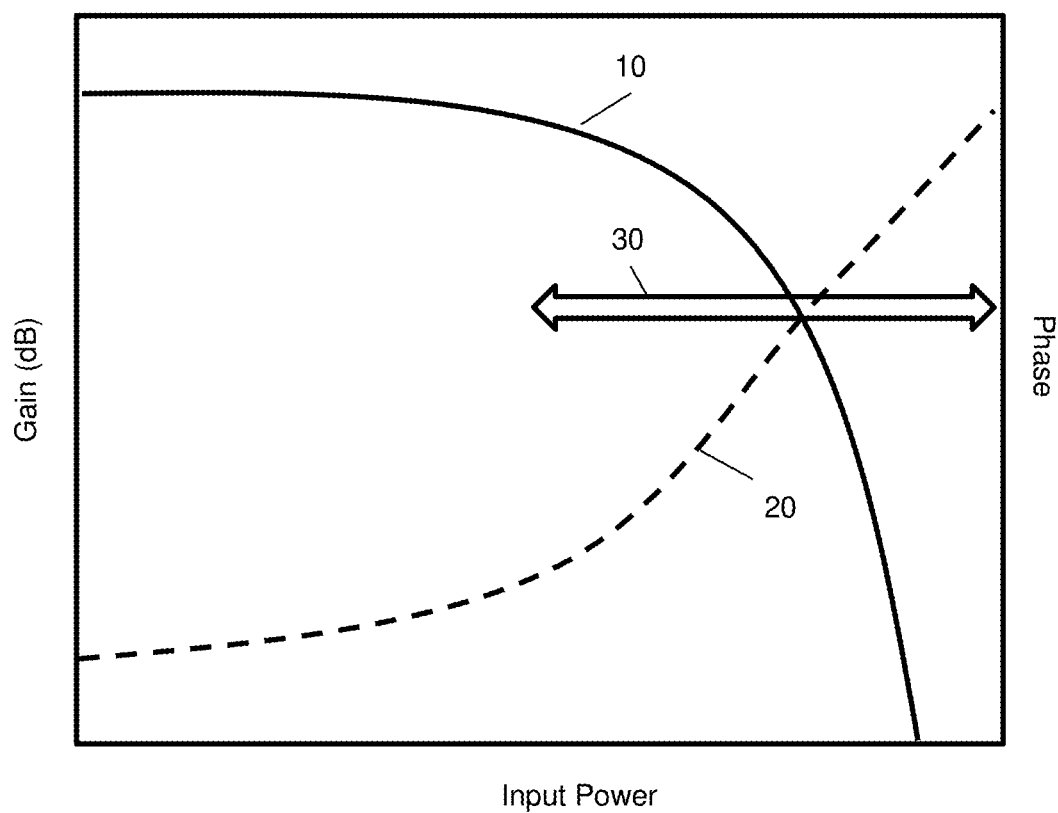
FIG. 1 is an example of non-linear behavior of a signal driven into compression.
Figure 2:
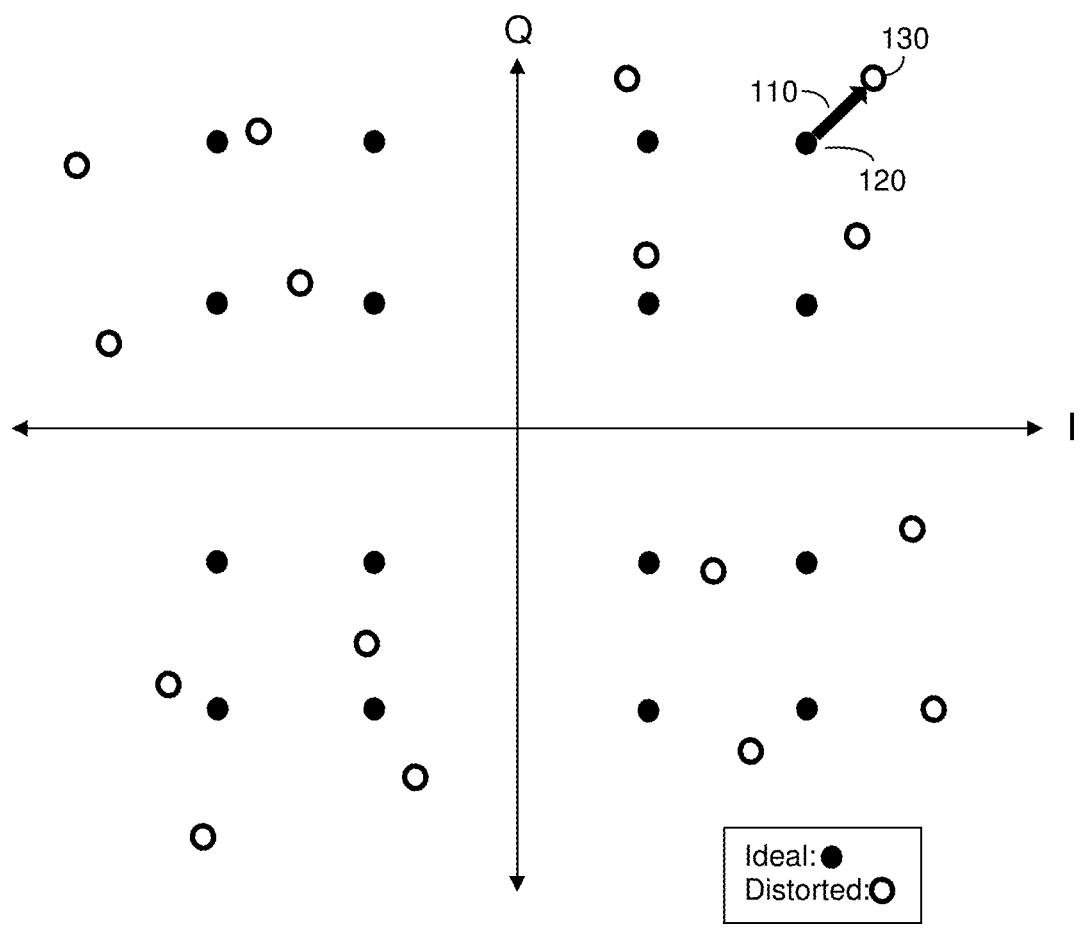
FIG. 2 is an example of EVM for a 16-QAM constellation.

An improved simulation to determine EVM is realized herein that determines the EVM from AM/AM-PM data without generating or demodulating IQ constellation data, thereby reducing the time required to predict EVM of a device design in simulation, producing an improvement to the technological art of RF device design.

As used herein, "RF device" refers to any device (such as an amplifier or transmitter) or device component (such as a transistor, switch, filter, etc.) used in RF signal transmission or processing. The examples and explanations herein may refer to an "amplifier" as an example RF device to simulate or test, but one skilled in the art would recognize that any RF device where unwanted non-linear contributions are a concern can be substituted for the systems and methods described. The RF device can be an active device or a passive device.

As used herein, "module" refers to a component of hardware, software, or firmware that performs a function. A single component can act as multiple modules if it can perform several functions.

As used herein, "AM" refers to amplitude modulation of a signal, such as a radio frequency (RF) signal, such as a signal compliant with WiFi (Wireless Fidelity) technology (e.g., IEEE 802.11 standard).

As used herein, "PM" refers to phase modulation of a signal, such as an RF signal, such as a signal compliant with WiFi.

As used in the present disclosure, the term "amplifier" refers to a device or component of a device that is configured to amplify a signal input to the device to produce an output signal of greater magnitude and greater power than the magnitude and power of the input signal. The term "power amplifier" (or "PA") refers to an amplifier designed primarily to increase power delivered to a load (a load with impedance).

As used in the present disclosure, the term "simulator" refers to computer/processor-run software that can model an RF device and simulates its output for a given input (or range of inputs) and can thus simulate, e.g., EVM of a RF power amplifier device under different circumstances (e.g., with different load impedances, having different parameters, or different device characteristics such as AM-AM and AM-PM distortion characteristics, etc.). Examples of simulators include Advanced Design System (ADS™) from Keysight, Microwave Office™ from AWR, or Spectre Simulation Platform™ from Candence. "Simulation(s)" refers to instances of the running of a simulator on a processor/computer.

As used herein, the term "modeling" refers to a computer representing a physical device or system in software and data, with properties being represented by data values that the software can read and/or manipulate to determine input/output results similar to the properties. An instance of a simulated device is referred to as a "model device".

Some methods or systems of determining EVM in simulation include computer generation of modulated IQ samples which enables calculation of EVM distortion either in the frequency domain or the time domain. In either case, however, the computer calculations involve the generation of modulated IQ samples in the time domain from ideal input data symbols in the frequency domain using an inverse Fourier transform, and in the case of calculations in the frequency domain, demodulation is also involved. In either case, distorted RF IQ samples in the time domain are generated by applying AM-AM/PM nonlinearity, modeled e.g., by a power amplifier's AM-AM/PM distortion curves, to modulated RF IQ samples in the time domain. In order to further improve EVM simulation time, it is desirable to calculate EVM directly from the AM-AM/PM distortion curves without generation or demodulation of modulated IQ samples.

Because the IQ constellation is "radially symmetric", that is distortion for IQ samples at any phase angle on the I-Q plane is the same and only depends on the magnitude of the ideal IQ sample, not the absolute phase angle of the IQ samples, the distortion characteristics of, for example, the square QAM IQ constellation are all contained in the AM and PM distortion that depends on only the magnitude of the input IQ constellation points. So, the absolute phase angle of IQ samples can be ignored.

This allows the system to calculate the IQ constellation distortion by using amplifiers AM and PM distortion characteristics only, since the single-tone Harmonic Balance AM-AM/PM simulation only sweeps the amplitude of continuous wave (CW) input sinewave and records the amplitude and phase of the output CW sinewave. Again, the absolute phase angle of input sinewave doesn't make any difference to EVM distortion as "linear phase shift" gets canceled out.

Since real and imaginary components of RF IQ signals are uncorrelated and each component is normally distributed with equal variance and zero mean, then the amplitude (absolute value or vector magnitude) can be characterized by a Rayleigh distribution. While this may not be 100% accurate (e.g., for actual WIFI OFDM data samples from a real WIFI modulator) due to silent tones, pilot symbols, etc., it is still a very good approximation of the distribution of RF IQ amplitude for very large number of samples. Similarly, the phase angle of RF IQ samples is uniformly distributed, meaning any phase angle is equally likely and can be ignored.

OFDM employing Quadrature Amplitude Modulation (QAM) is used in the examples below, but any coding system with a rotationally symmetric IQ constellation can be used.

This means that EVM distortion of e.g., 'WIFI OFDM modulation' can be estimated by the system by assuming that the statistical distribution of the amplitude of RF IQ samples follows (approximately) a Rayleigh distribution. Since IQ constellations are radially symmetric, absolute phase angle can be ignored from calculations and only amplitude used.

EVM

The EVM is defined as the mean of squared distances between the ideal and distorted IQ data, divided by the root mean square (RMS) power of the ideal IQ data. This is equivalent to the average error power divided by the average input/constellation power. EVM can be expressed in % of average power in linear units (Watts) or as a ratio of powers in logarithmic units (dB).

RF devices, like a power amplifier, typically have linear gain (or loss, for non-amplifier devices) and linear phase shift (constant delay in time for each frequency component of the input signal). For example, a WiFi power amplifier might have a gain of around 30 dB and a phase shift between 100-200 degrees. Therefore, before EVM is calculated, the distorted IQ data can be normalized to the ideal IQ data (amplitude and phase adjusted to be as close as to the ideal data, removing the "linear" gain and linear phase shift from the system—known as "scaling and de-rotation" to compensate for the linear effects before estimating an EVM which is primarily due to remaining nonlinearities). Alternatively, the ideal IQ data can be normalized to the distorted IQ data. Typically, this normalization is done by a complex-valued linear scaling factor ($\beta^*$) (representing linear gain and linear phase of the amplifier and hence the linear part of the relationship between input and output constellations). In other words, the scaling factor represents the reciprocal of the linear gain and phase of the amplifier. In design simulations, where the ideal IQ and distorted IQ data are both known, the scaling factor ($\beta^*$) is determined based on a linear least-squares fit between ideal and distorted IQ data, thereby minimizing the EVM in the linear least squares sense. The scaling factor ($\beta^*$) is equal to the value of ($\beta$) in equations 1.1 and 1.2 that minimizes the value of EVM and $EVM_{dB}$ $$EVM = \sqrt{\frac{\frac{1}{n}\sum |IdealIQ - \beta * DistortedIQ|^2}{\frac{1}{n}\sum |IdealIQ|^2}} \quad \text{equation 1.1}$$

or as $$EVM_{dB} = \quad \text{equation 1.2}$$

$$10\log_{10}\frac{ErrPwr}{RefPwr} = 10\log_{10}\frac{\frac{1}{n}\sum |IdealIQ - \beta * DistortedIQ|^2}{\frac{1}{n}\sum |IdealIQ|^2}$$

One typical method of modeling the non-linear distortion is by using AM-AM (amplitude) and AM-PM (phase) conversion. This means variation in input amplitude (magnitude of IQ samples) causes nonlinear distortion in both output amplitude and output phase and the nonlinearity is often modeled by a higher order (order>1) polynomial function in simulation, e.g., AM amplitude distortion modeled as (3*AM+0.3*AM^2-0.6*AM^3) and phase distortion as (2+0.1*AM-0.2*AM^2) radians, where AM is the variable representing the input amplitude in linear units such as Volts.

Since distortion is dependent only on the amplitude of the input signal, the distortion characteristics become completely "radially symmetric" i.e., distortion is the same in every angle, and only depends on the magnitude of input signal.

Figure 3B:
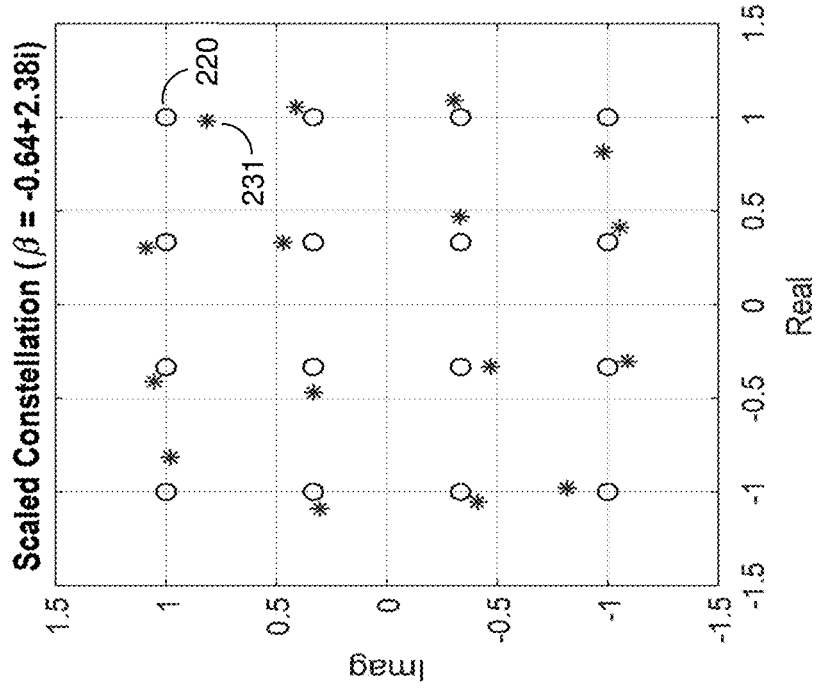
FIG. 3A and 3B are examples of a conversion from a raw constellation (FIG. 3A) to a constellation that has been scaled for EVM computation (FIG. 3B).
Figure 3A:
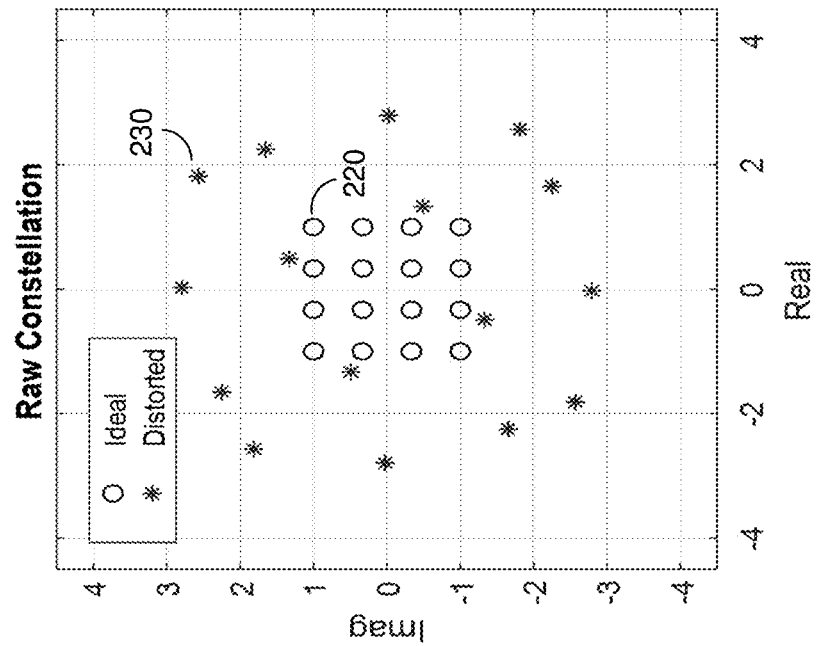

FIGS. 3A and 3B show an example of an IQ constellation of an OFDM signal coding scheme (here, 16-QAM) scaled to provide a minimum EVM. FIG. 3A shows the raw ideal (220) input signals and the distorted (230) output signals. As shown, the distorted signals (230) are both expanded (gain) and rotated (phase shift) from the ideal (220). FIG. 3B shows the same ideal points (220) with output points (231) scaled (e.g., ($\beta=\beta^*=-0.64+2.38i$) to provide the smallest (in linear least squares sense) EVM possible between the ideal (220) and scaled distorted (231) points when only the higher order ($2^{nd}$ and above) terms of the distortion are taken into account (e.g., AM-AM and/or AM-PM saturation distortion effects).

It should be noted that in a real receiver the scaling and de-rotation is performed based on using known "pilot symbols" since the ideal IQ constellation for the data bits is not known in advance by the receiver. In a design simulation, however, the ideal IQ and distorted IQ constellation are both known. Therefore, in simulations it is easier to perform the scaling and rotation of distorted constellation by directly calculating required scaling factor (complex number, including both amplitude and phase) from ideal and distorted IQ constellations. The scaling factor thus represents the reciprocal of the linear amplitude and linear phase of the amplifier. Using direct calculation of EVM between Ideal and Distorted constellations allows for an analytic solution for EVM, expressed in terms of an equation 2 as explained in the following description.

Scaling Factor Calculation—Determining and Analytical Expression for the Optimum Scaling Factor As described in more detail in the previous section, a system, such as a power amplifier, that has an input signal coded to an IQ constellation will typically impart a gain or loss and/or a phase shift to the constellation points in the system's output. Therefore, this "linear" amplitude and phase change to the constellation points are to be scaled down to produce the minimal EVM before EVM calculation. The complex linear scaling factor can be derived by minimizing the sum of squares of errors between the input "ideal" (x) and output "distorted" (y) signal, as shown below, by setting partial derivatives of the expression S with respect to real and imaginary parts of $\beta$ to zero respectively. The value of $\beta$ shown in the box in the below is the analytical expression for the optimum (in the sense of linear least squares) minimizing value of $\beta$ which we called $\beta^*$ in the previous section.

$$S = \sum |\beta y - x|^2 = \sum (\beta y - x)\overline{(\beta y - x)} =$$

$$\sum [((\text{Re}(\beta) + i\text{Im}(\beta))\text{Re}(y) + i\text{Im}(y)) - (\text{Re}(x) + i\text{Im}(x))) \cdot$$

$$((\text{Re}(\beta) - i\text{Im}(\beta))(\text{Re}(y) - i\text{Im}(y)) - (\text{Re}(x) - i\text{Im}(x)))] =$$

$$\sum [(\text{Re}(\beta)\text{Re}(y) - \text{Im}(\beta)\text{Im}(y) - \text{Re}(x))^2 +$$

$$((\text{Re}(\beta)\text{Im}(y) + \text{Im}(\beta)\text{Re}(y) - \text{Im}(x)))^2]$$

$$\frac{\partial S}{\partial \text{Re}(\beta)} = 2\sum \text{Re}(y)(\text{Re}(\beta)\text{Re}(y) - \text{Im}(\beta)\text{Im}(y) - \text{Re}(x)) +$$

$$2\sum \text{Im}(y)(\text{Re}(\beta)\text{Im}(y) + \text{Im}(\beta)\text{Re}(y) - \text{Im}(x)) = 0$$

$$\frac{\partial S}{\partial \text{Im}(\beta)} = -2\sum \text{Im}(y)(\text{Re}(\beta)\text{Re}(y) - \text{Im}(\beta)\text{Im}(y) - \text{Re}(x)) +$$

$$2\sum \text{Re}(y)(\text{Re}(\beta)\text{Im}(y) + \text{Im}(\beta)\text{Re}(y) - \text{Im}(x)) = 0$$

$$\text{Re}(\beta) = \frac{\sum (\text{Re}(y)\text{Re}(x) + \text{Im}(y)\text{Im}(x))}{\sum (\text{Re}(y)^2 + \text{Im}(y)^2)}$$

$$\text{Im}(\beta) = \frac{\sum (\text{Re}(y)\text{Im}(x) - \text{Im}(y)\text{Re}(x))}{\sum (\text{Re}(y)^2 + \text{Im}(y)^2)}$$

$$\boxed{\beta = \frac{\sum \overline{x}y}{\sum \overline{y}y}}$$

The bar (e.g., $\overline{x}$) indicates a complex conjugate and the above equation reflects normalization of distorted values to ideal values. A scaling factor normalizing ideal values to the distorted values can also be used, but as seen below, this is irrelevant as the scaling factor will be dropping out once the above expression for the optimum scaling factor value is substituted into the EVM equation (here expressed in terms of EVM power):

equation 2

$$EVM_{dB}^* =$$

$$10\log_{10}\frac{\frac{1}{n}\sum |\beta y - x|^2}{\frac{1}{n}\sum |x|^2} = 10\log_{10}\frac{\sum (\beta y - x)\overline{(\beta y - x)}}{\sum x\overline{x}} =$$

$$10\log_{10}\left(\beta\overline{\beta}\frac{\sum y\overline{y}}{\sum x\overline{x}} - \beta\frac{\sum y\overline{x}}{\sum x\overline{x}} - \overline{\beta}\frac{\sum \overline{y}x}{\sum \overline{x}x} + 1\right) = 10$$

$$\log_{10}\left(\frac{\sum \overline{x}y}{\sum y\overline{y}}\frac{\sum x\overline{y}}{\sum \overline{y}y}\frac{\sum y\overline{y}}{\sum x\overline{x}} - \frac{\sum \overline{x}y}{\sum \overline{y}y}\frac{\sum y\overline{x}}{\sum x\overline{x}} - \frac{\sum x\overline{y}}{\sum \overline{y}y}\frac{\sum \overline{y}x}{\sum \overline{x}x} + 1\right) =$$

$$EVM_{dB}^* = 10\log_{10}\left(1 - \frac{\sum \overline{x}y}{\sum x\overline{x}}\frac{\sum \overline{y}x}{\sum \overline{y}y}\right)$$

Note that the EVM value in equation 2 with the expression for the optimum scale factor substituted in is denoted by a "*" superscript. Therefore, the EVM can be determined directly without first determining a scaling factor, as the optimal scaling factor is inherent in equation 2. The EVM expression in equation 2 may incorporate weighting factors, elements of a weighting matrix W, in its summation terms as shown below:

$$EVM^*(x, y, W) = 1 - \frac{\sum \overline{x}yw}{\sum x\overline{x}w}\frac{\sum \overline{y}xw}{\sum \overline{y}yw} \quad \text{equation 3}$$

Weighting Values

Figure 5:
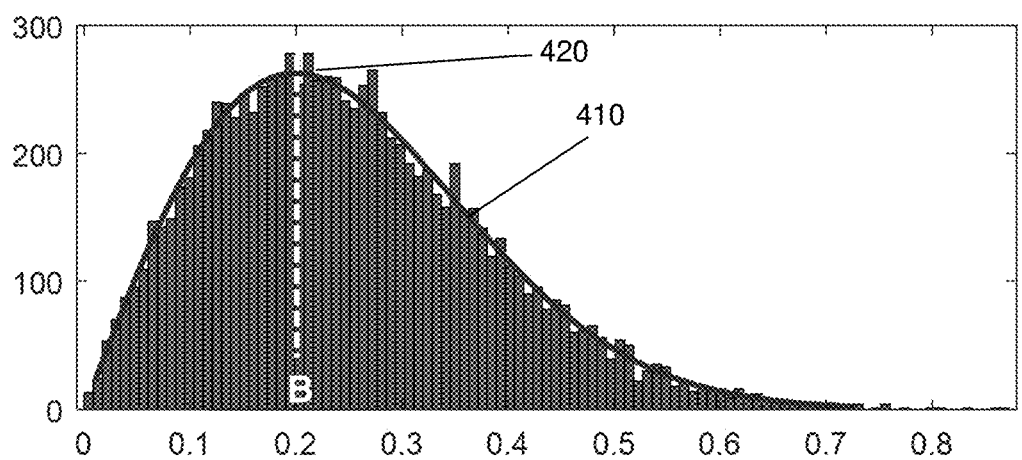
FIG. 5 shows an example of a histogram of amplitudes of OFDM RF IQ samples in a Rayleigh distribution.

Some embodiments derive the weighting matrix values by fitting a Rayleigh distribution (Rayleigh probability distribution function PDF) to a histogram of magnitude values of OFDM modulated RF IQ samples. An example of the histogram is shown in FIG. 5, where the horizontal axis is the axis of normalized values of magnitude and the vertical histogram axis is the number (of occurrence) counts for specific magnitude values of the horizontal axis. In FIG. 5, the magnitude histogram is fitted to a Rayleigh distribution PDF (410) where the so-called "scale parameter of the distribution", denoted as B, corresponds to the horizontal coordinate of the peak (420) of the Rayleigh distribution (at about 0.2 in this example) and where the mean value of the distribution in the case of WiFi OFDM is equal to the peak to average (highest instantaneous power to average power) ratio (PAPR) of the modulated signal. The mean value of a Rayleigh distribution is related to its scale parameter through the following equation:

$$\text{mean of Rayleigh distribution} = PAPR = B\sqrt{\frac{\pi}{2}}, \quad \text{equation 4}$$

from which the scale parameter B of the fitted distribution is determined as $$B = PAPR/\left(\sqrt{\frac{\pi}{2}}\right).$$

In high peak-to-average modulations like the WiFi OFDM, most of signal content is approximately 8-12 dB below the highest peaks of the modulated signal. This has significant impact on how the shape of the AM-AM/PM curves impacts the resulting EVM distortion as EVM is dominated by shapes of AM-AM/PM curves at backed-off power levels (backed off by an amount determined by PAPR) from the highest peak.

An example of calculating the values (w) of the weighting matrix W is using the formula for the probability density function of the fitted Rayleigh distribution:

$$w = \frac{x}{B^2} e^{\frac{-x^2}{2B^2}} \quad \text{equation 5}$$

In other embodiments, the statistical distribution of the amplitudes/magnitudes of the RF IQ samples may follow a distribution different than a Rayleigh distribution.

EVM Power

A final EVM power or value can be calculated from EVM* by adding a EVM noise floor value (EVM$_{floor}$) (typically about −55 dB) by:

$$EVM_{dB} = 10\log_{10}\left(\sqrt{(EVM^*)^2 + 10^{(EVM_{floor}/10)^2}}\right) \quad \text{equation 6}$$

The floor value, for example, can prevent the EVM values from falling to lower and lower values as output power values are further and further reduced.

Device Design Validation

Figure 6A:
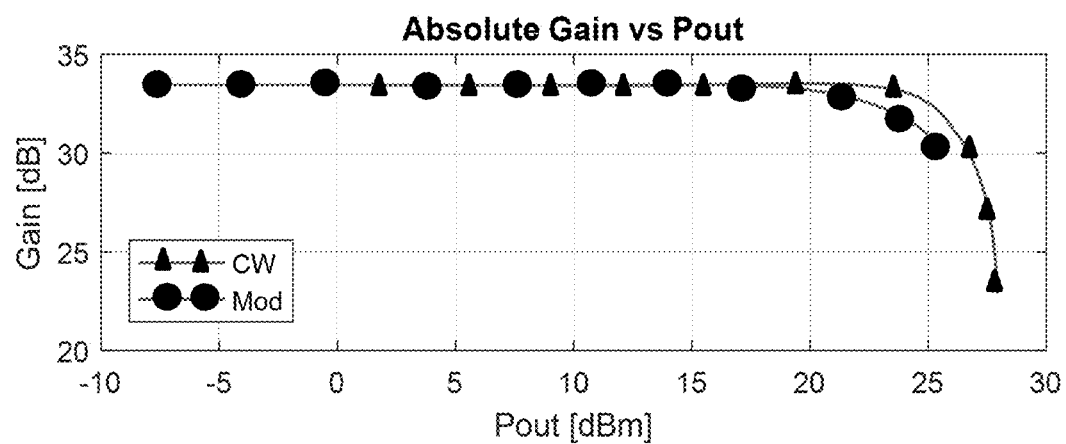
FIGS. 6A-6C show example graphs for a power amplifier simulation where Zload is 50 ohms.
Figure 6B:
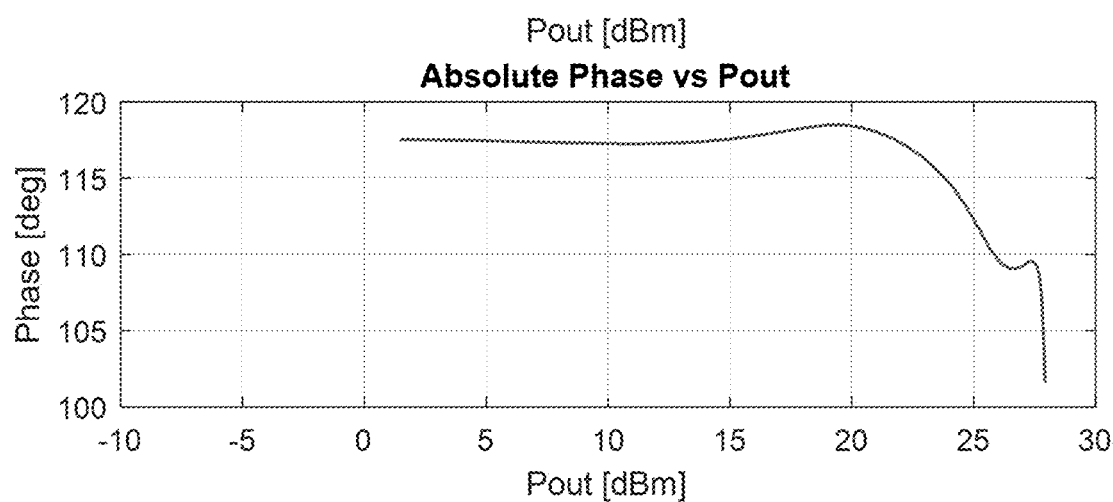
Figure 6C:
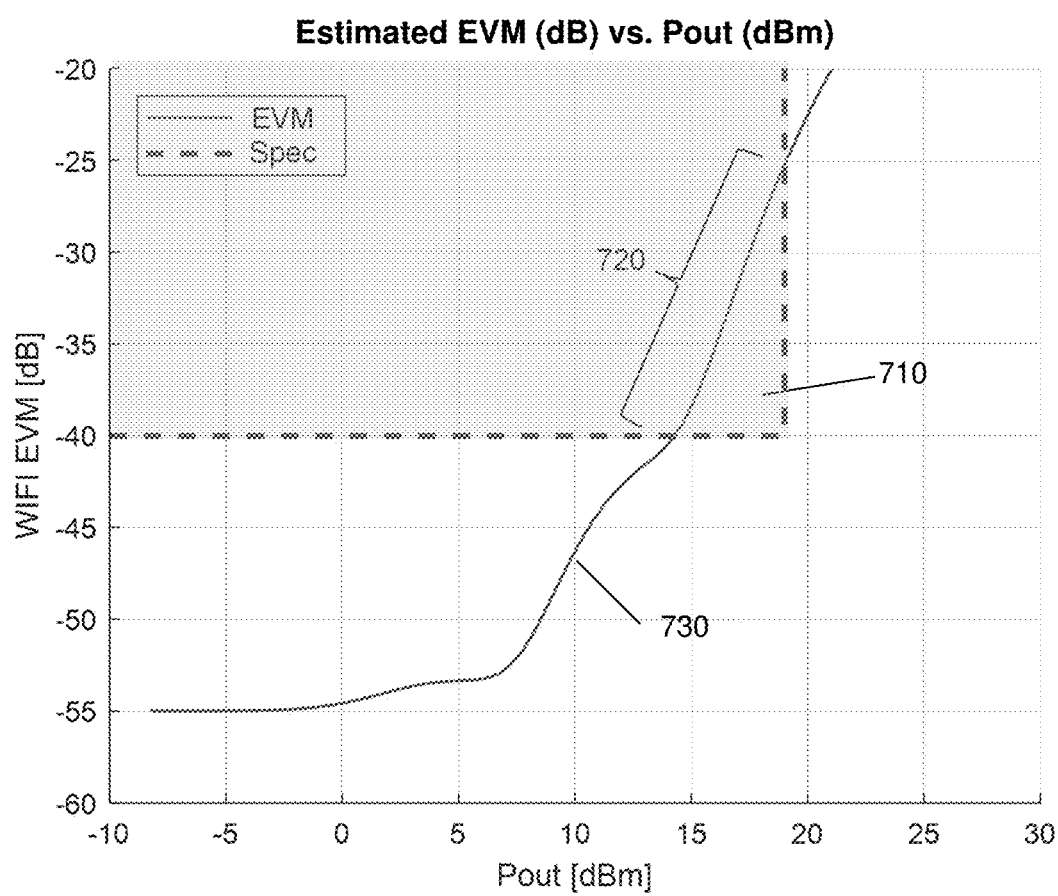

The EVM values can be plotted vs. output power of a power amplifier (see e.g., FIG. 6C). In this example, the plot informs the designer that the power amplifier under design exceeds a pre-specified EVM design maximum threshold value of about −40dB when the output power level reaches about 15 dBm. Ideally, the EVM values would lie outside the zone (710) for up to about 19 dBm output power. The designer may iterate and improve on the design, e.g., to try to delay the crossover of EVM values into zone 710 with increasing output power levels.

Example Methods

Figure 11A:
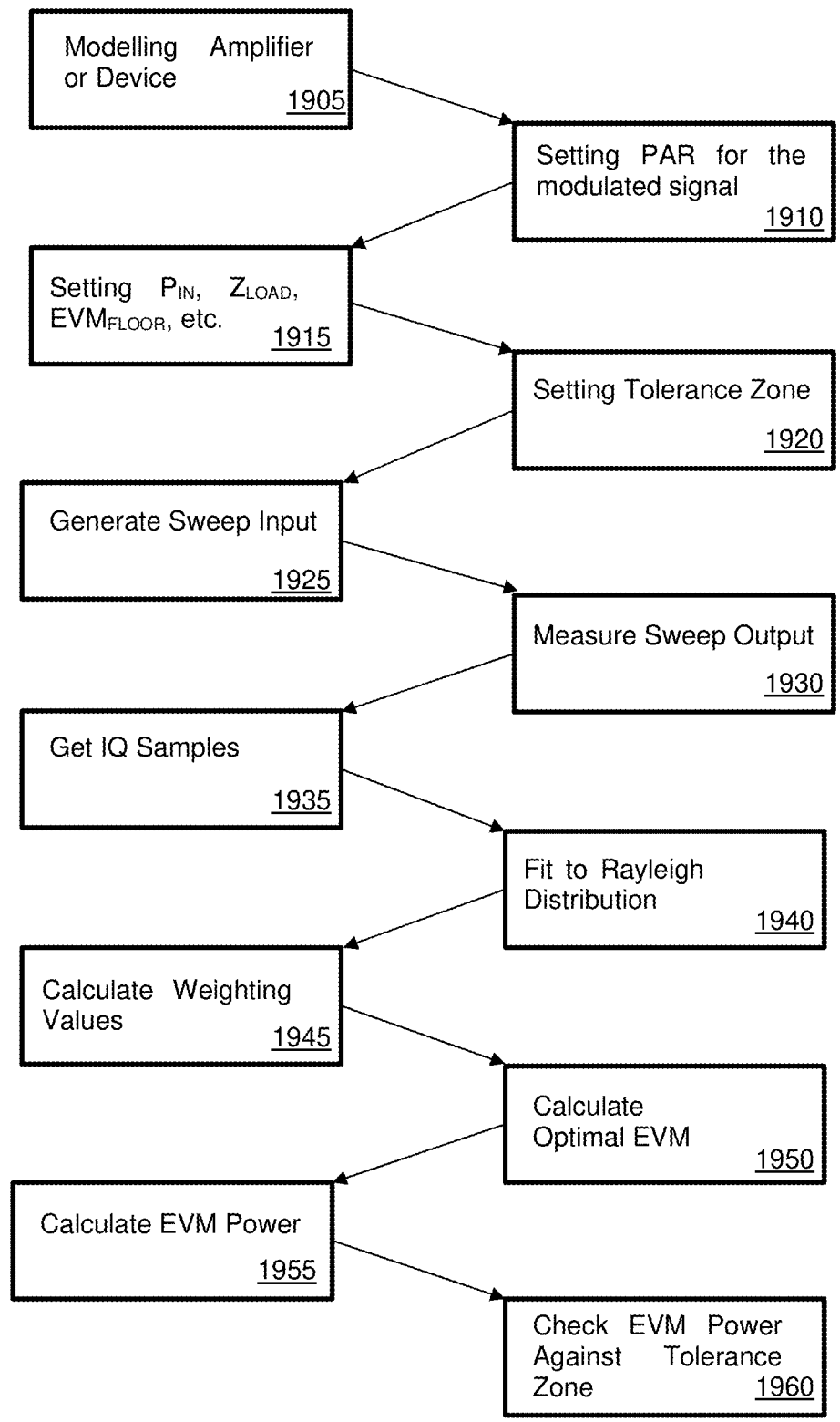
FIGS. 11A and 11B shows example flowcharts of embodiments of the computer-implemented method for device simulation and EVM prediction.

An aspect of the invention, shown as an exemplary flowchart in FIG. 11A, includes a method for designing an amplifier (or any other RF device), including:
 modeling the amplifier in a simulator as a model amplifier (1905);
 setting a peak to average ratio (PAR) value for a modulated signal to be applied to the device (e.g., according to WiFi OFDM) (1910);
 setting simulation values for input source power, Pin, sweep, e.g., starting and ending values of the sweep and steps in between; amplifier load impedance; and EVM floor value (EVMfloor) in the simulator (1915);
 setting a specified tolerance zone of EVM power vs output power, Pout, for the model amplifier circuit (1920);
 providing a simulated sweep of input source power Pin values that correspond to a sweep of input voltage amplitude values, x=Vin, as an input signal for the model amplifier, where the input peak voltage values are derived from the input power values by assuming a value for the internal source resistance (e.g., 50 Ohms) (1925);
 measuring a sweep of output voltage amplitude values, y=Vload, across the amplifier load impedance (1930) (the method effectively treats the x and y values as virtual constellation points);
 fitting the histogram of magnitudes of IQ samples (1935) to a Rayleigh distribution, the Rayleigh distribution (i.e., probability density function (PDF)) having a mean value proportional to the peak to average ratio PAPR in order to properly account for the modulation (1940);
 calculating a weighting factor matrix of weighting values (w) from the fitted Rayleigh PDF (1945);
calculating the optimal EVM value, EVM*, from a function of the input voltage amplitude values (x), the output voltage amplitude values (y), and the weighting factor matrix (1950);
 calculating, from the optimal EVM value, EVM*, and the EVM floor value, EVMfloor, the EVM power, EVM, as a function of the output power Pout (1955); and
 comparing a function of the EVM power, plotted against the output power of the model amplifier, to the tolerance zone (1960), thereby determining if the amplifier is in tolerance; wherein
 the amplifier is designated as "out-of-spec" (not in tolerance; e.g., one or more calculated error vector magnitude values are within an out-of-spec zone) if a portion of the function falls within the tolerance zone and as "in spec" (in tolerance) if the function of the EVM power does not cross the tolerance zone.

An aspect of the invention includes validating a physical amplifier (rather than validating a simulation during the design process) against a specification (e.g., for a given tolerance zone), the method being substantially as above except that the amplifier is not modelled in a simulator, the input sweep is physically applied (transmitted) to the amplifier and the output sweep is measured from the amplifier's retransmission of the input signal, with the computer system performing the needed calculations based on the input and output. The system performing the calculations can be the same system providing the input sweep and reading the output sweep. Again, the device does not need to be an amplifier: any RF device can be similarly simulated and designed.

Figure 11B:
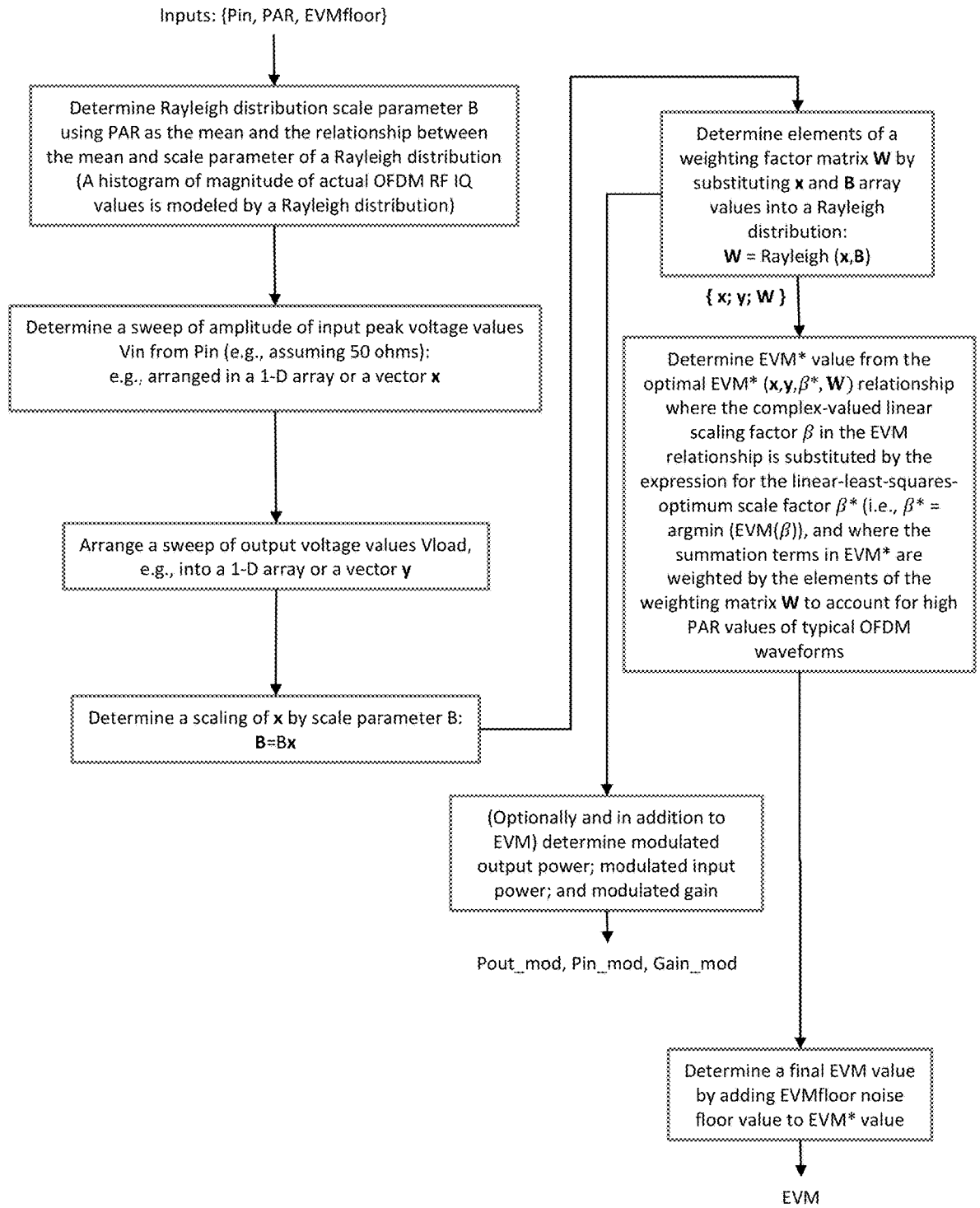

The above steps of determining the EVM values are illustrated in the example flow diagram shown in FIG. 11B, including the inputs and outputs.

Embodiments can include modelling the amplifier design in a simulator (software) as a model amplifier. The example here is an amplifier (such as a WiFi network power amplifier or cellular network power amplifier) but can be any device that has an RF input and RF output coded to an IQ constellation. The method works for WiFi operational frequencies but can also work for any RF signal, e.g., for 5G cellular frequencies.

Embodiments can include specifying a peak to average ratio (PAR) for accounting for modulation waveforms or modulation schemes. It can be specified according to a specific modulation, e.g., WiFi OFDM, 5G OFDM etc.

Embodiments can include setting values for input power, amplifier load impedance, and EVM floor value in the simulator. These values can also be determined by the specification based on expected use of the amplifier. Multiple simulations can be run under different power, impedance, and/or floor values. The impedance may be complex valued and can be provided as a complex number value in units of resistance. Sweeps of input power can be generated, and output load voltage and current can be determined in a simulator such as a Harmonic Balance Simulator (HB S).

Embodiments can include setting a tolerance zone of EVM power vs output power for the model amplifier. FIG. 6C shows an example tolerance zone (710) defined by the specification of the amplifier. The boundaries for this example are no larger than −40 dB for the EVM up to about 19-to-20 dBm power output ("about" being within a 3% margin). Any EVM larger than −40 dB for any power output under 20 dBm would be "out of spec" for the amplifier, indicating that the amplifier did not meet the specifications under the specific simulation or measurement conditions.

Embodiments can include performing a sweep of input voltage amplitude values as an input signal for the model amplifier where the input peak voltage values are derived from the input power based on an input source resistance value. The sweep can be a single tone sinusoidal continuous wave power sweep. The voltages can be virtual (in simulation) or real (for validating a physical device). The sweep can be a multi-tone harmonic balance AM/AM-PM power sweep, for example 20, 40, 80, 160, and 320 MHz.

Embodiments can include determining a sweep of output voltage amplitude values across the amplifier load impedance. This will provide EVM results for the given load impedance value.

Figure 4:
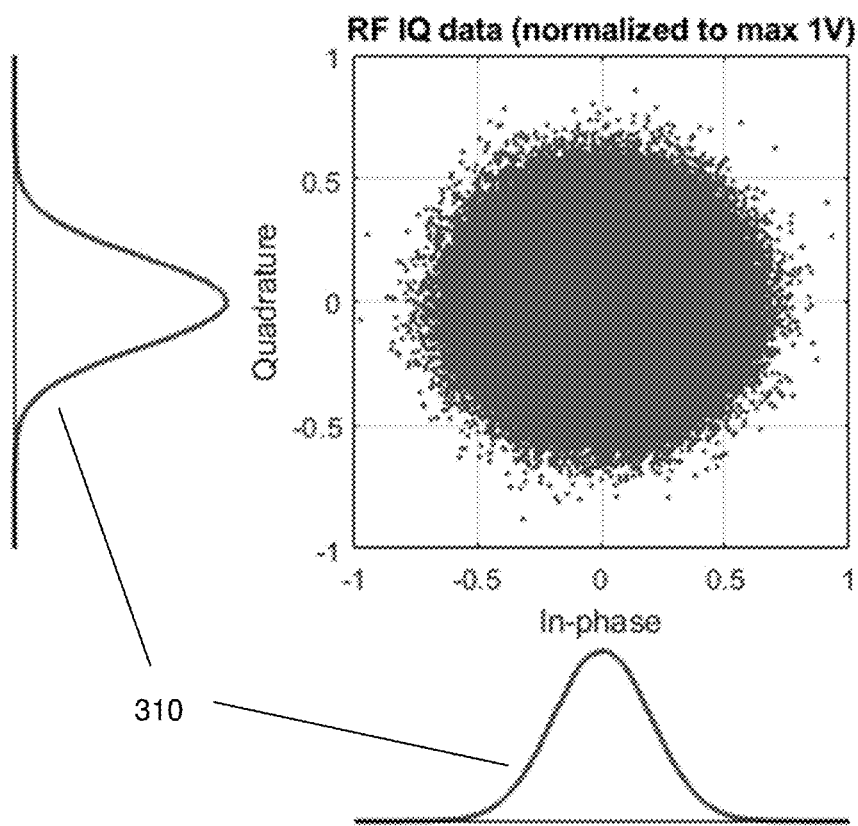
FIG. 4 shows an example of radio frequency (RF) IQ constellation data.

The I and Q components of an inverse fast Fourier transform (IFFT) of the input are taken to be normally distributed, thereby their magnitudes would roughly follow a Rayleigh distribution. An example of a normalized (to 1 volt maximum) IQ constellation is shown in FIG. 4, where the normal distributions (310) of I and Q components is shown.

Embodiments can be based on modeling the magnitude histogram of IQ samples by a Rayleigh distribution, the Rayleigh distribution having a mean value proportional to the peak to average ratio (PAR). We refer to this Rayleigh distribution with this specific mean value as the fitted Rayleigh distribution. See e.g., equation 4.

Embodiments can include calculating a weighting factor matrix from the fitted Rayleigh distribution. See e.g., equation 5.

Embodiments can include calculating the optimal EVM value from a function of the input voltage amplitude values, the output voltage amplitude values, and the weighting factor matrix. This can be done, for example, as shown in equation 3 in the above.

Embodiments can include calculating the EVM power as a function of the optimal EVM value and, optionally, the EVM floor value. This can be done, for example, as shown in equation 6 above.

Embodiments can include determining if the EVM power plotted against the output power of the model amplifier falls within the tolerance zone; wherein the amplifier design is designated as "out-of-spec" if a portion of the function falls within the tolerance zone and as "in-spec" if the function does not cross the tolerance zone. An example of an out-of-spec scenario is shown in FIG. 6C, where a portion (720) of the EVM plotted function (730) is within the tolerance zone (710).

Figure 6D:
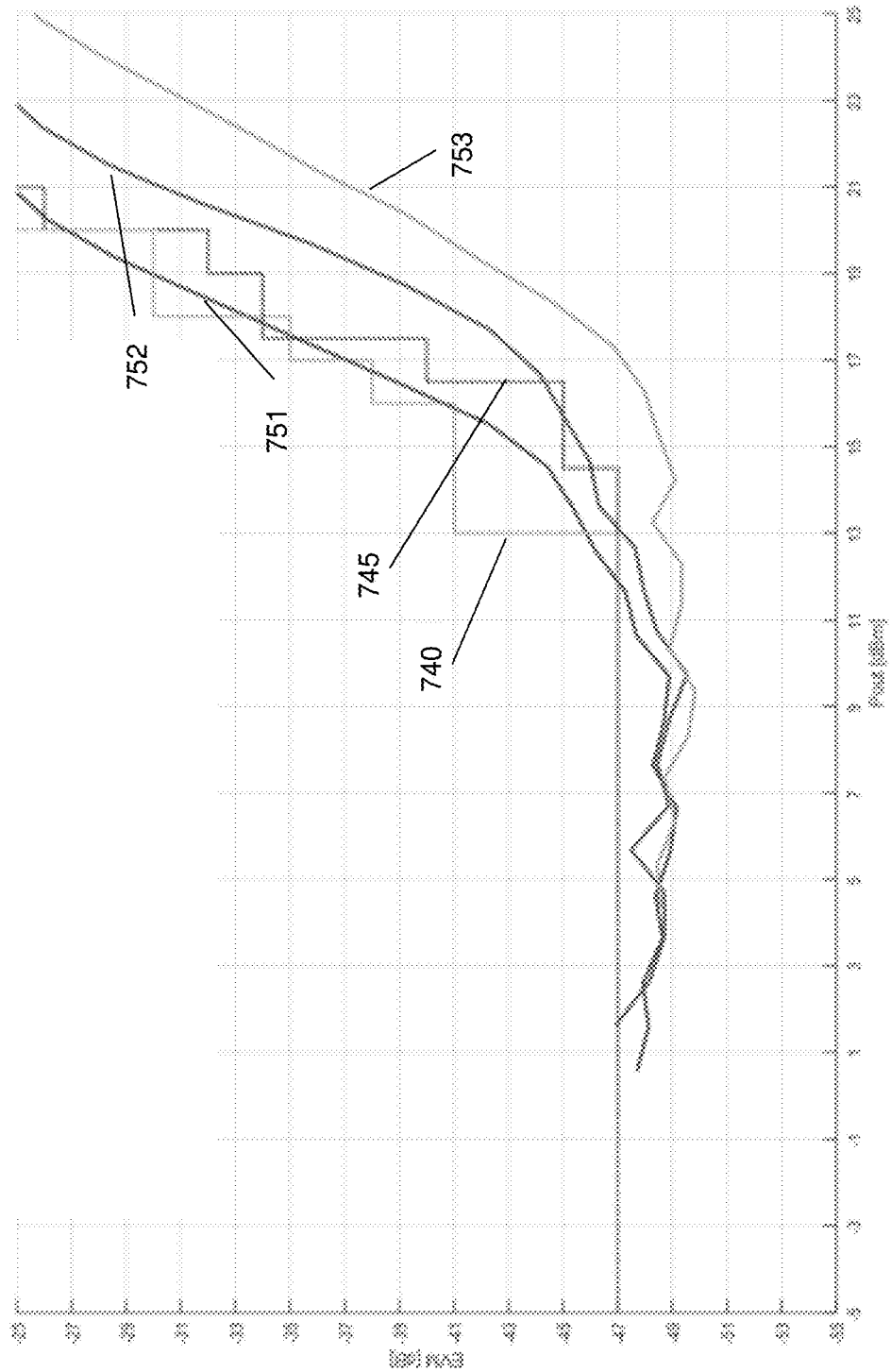
FIG. 6D shows an example graph for estimated EVM characteristics compared to tolerance zones defined according to other embodiments.
Figure 7A:
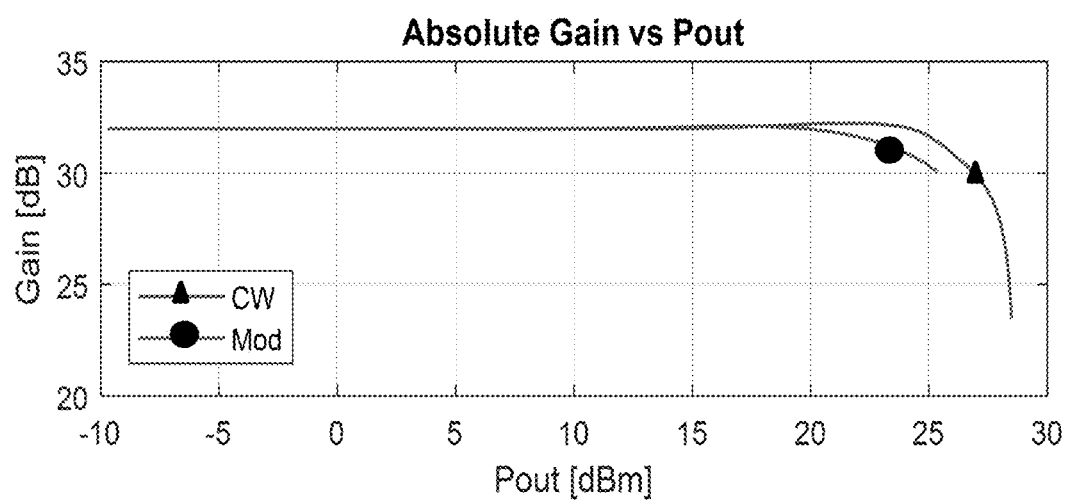
FIGS. 7A-7C show example graphs for a power amplifier simulation where Zload is 100 ohms.
Figure 7B:
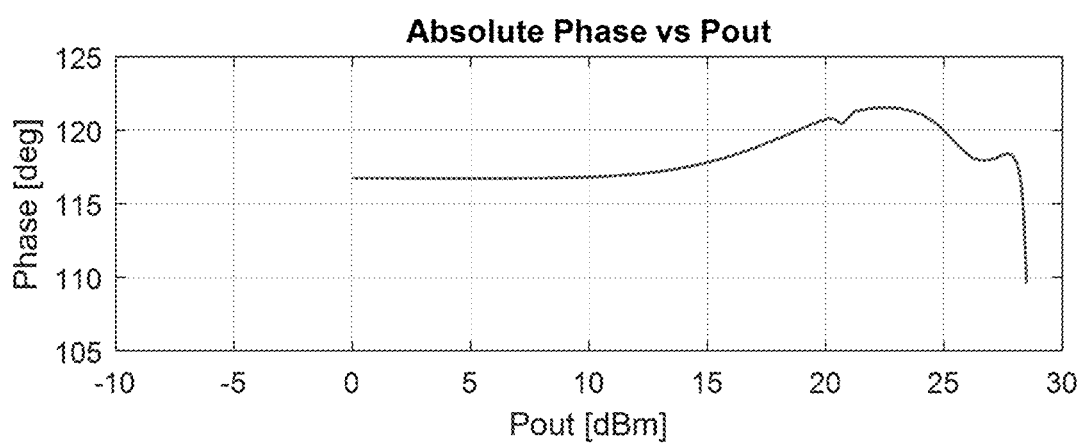
Figure 7C:
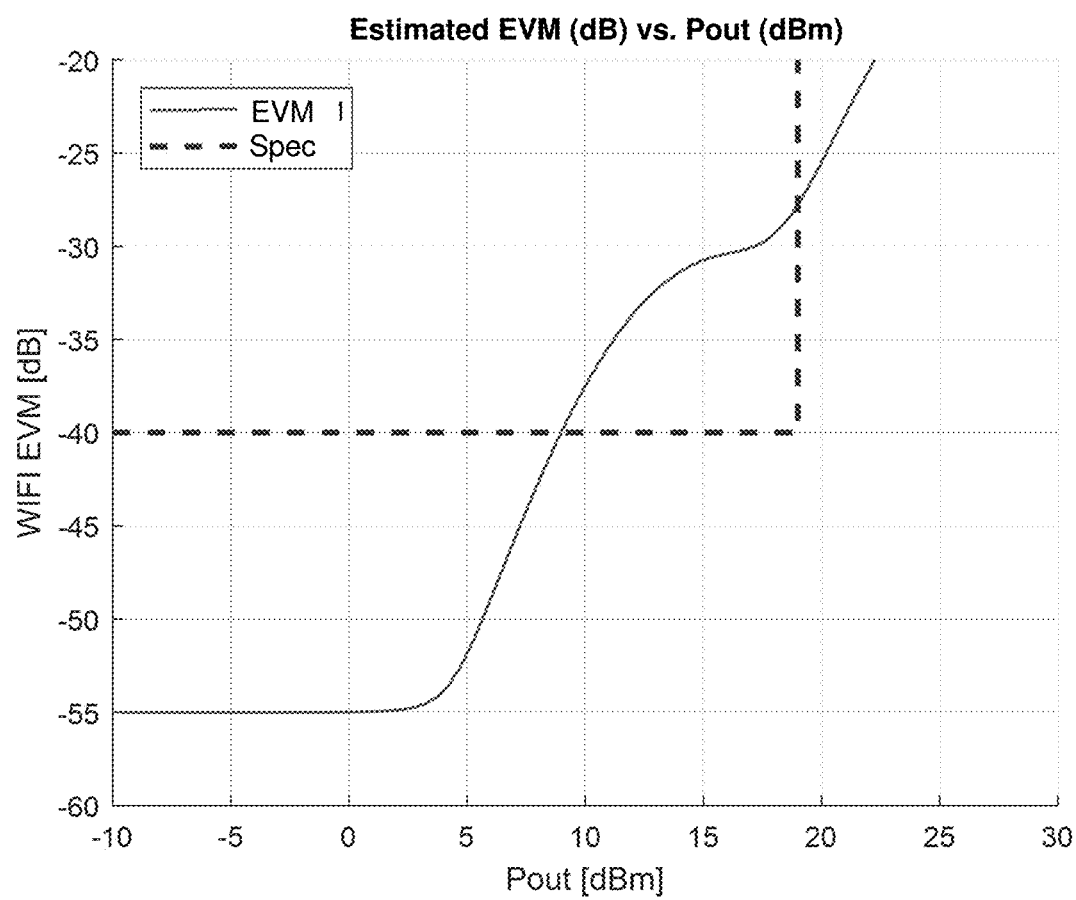
Figure 8A:
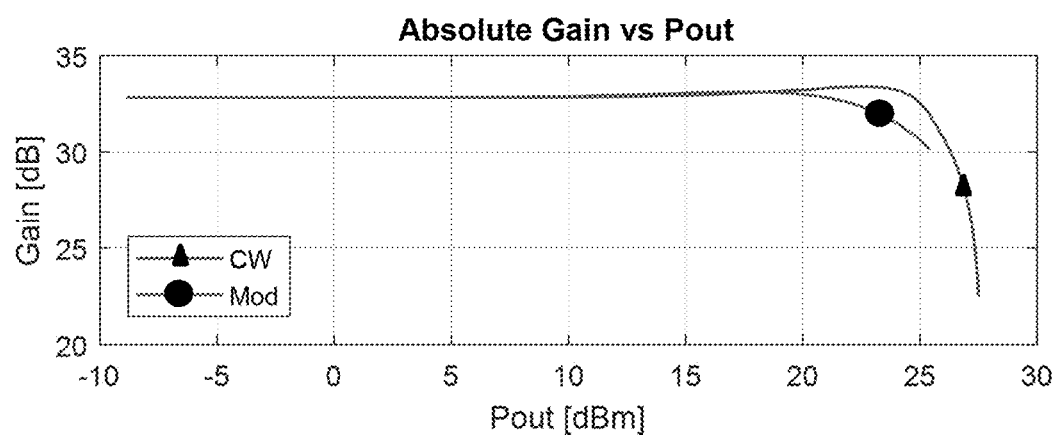
FIGS. 8A-8C show example graphs for a power amplifier simulation where Zload is 50+j50 ohms.
Figure 8B:
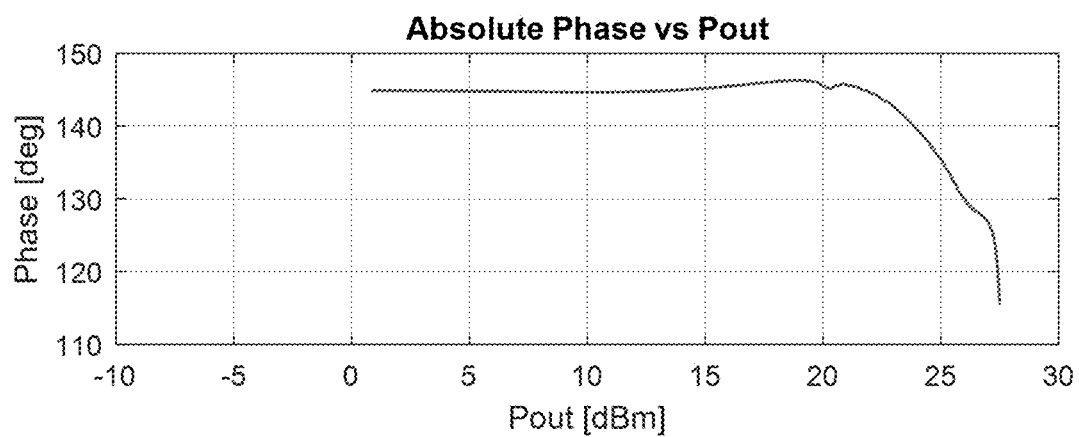
Figure 8C:
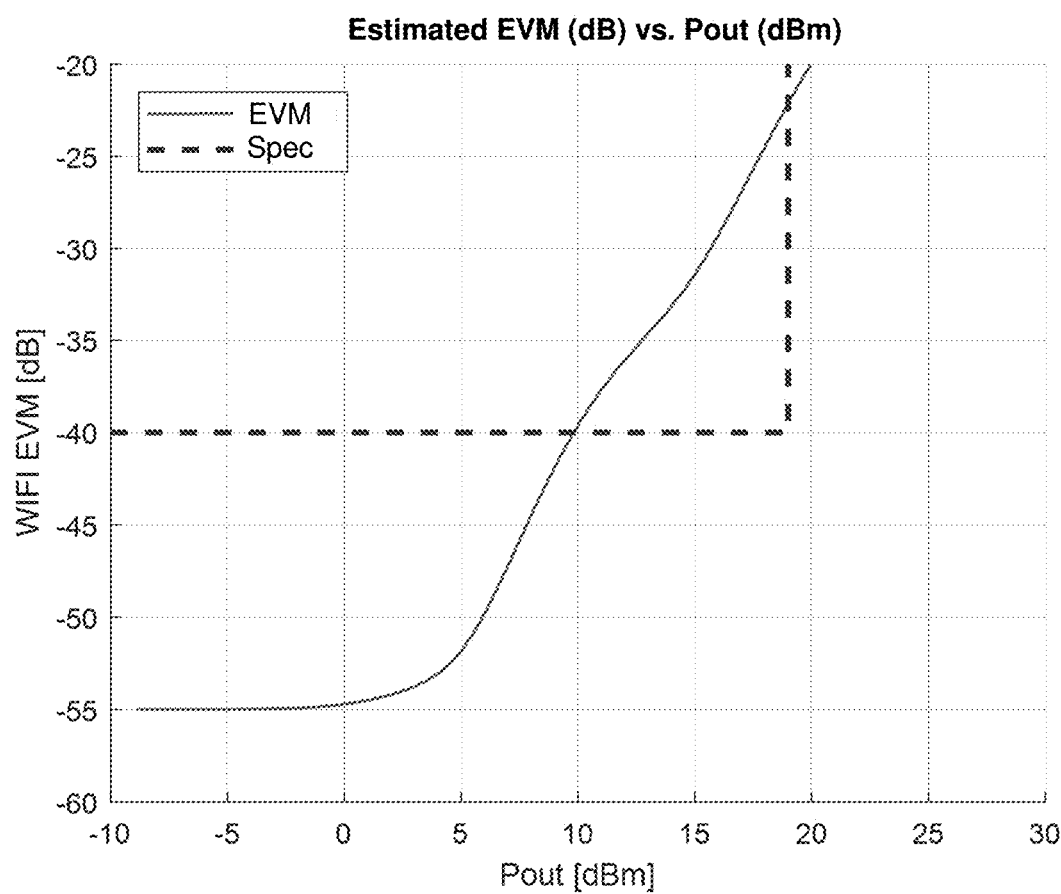

FIG. 6C depicts a constant threshold value of −40 dB, above which the model amplifier is "out-of-spec". In some embodiments the threshold value may be non-constant and a monotonically increasing function of output power. For example, the threshold may be constant up to a certain value of output power, but it may then become a stepwise (e.g., "staircase") increasing function of output power beyond that certain value. In such embodiments, progressively higher EVM values may thus be allowed (i.e., are "in-spec") as the output power increases. FIG. 6D shows examples of in-spec and out-of-spec determinations for device designs where tolerance zones are defined by stepwise increasing functions. Shown are two different tolerance zones in dashed lines (740,745) and three design curves in solid lines (751, 752,753) compared to them. One device (751) crosses within both zones (740,745) and so is out-of-spec for both specifications. One device (752) is in-spec for one tolerance zone (740) but out-of-spec for the other zone (745). The last device (753) is in-spec for both zones (740,745) as it remains outside those zones.

Figure 10A:
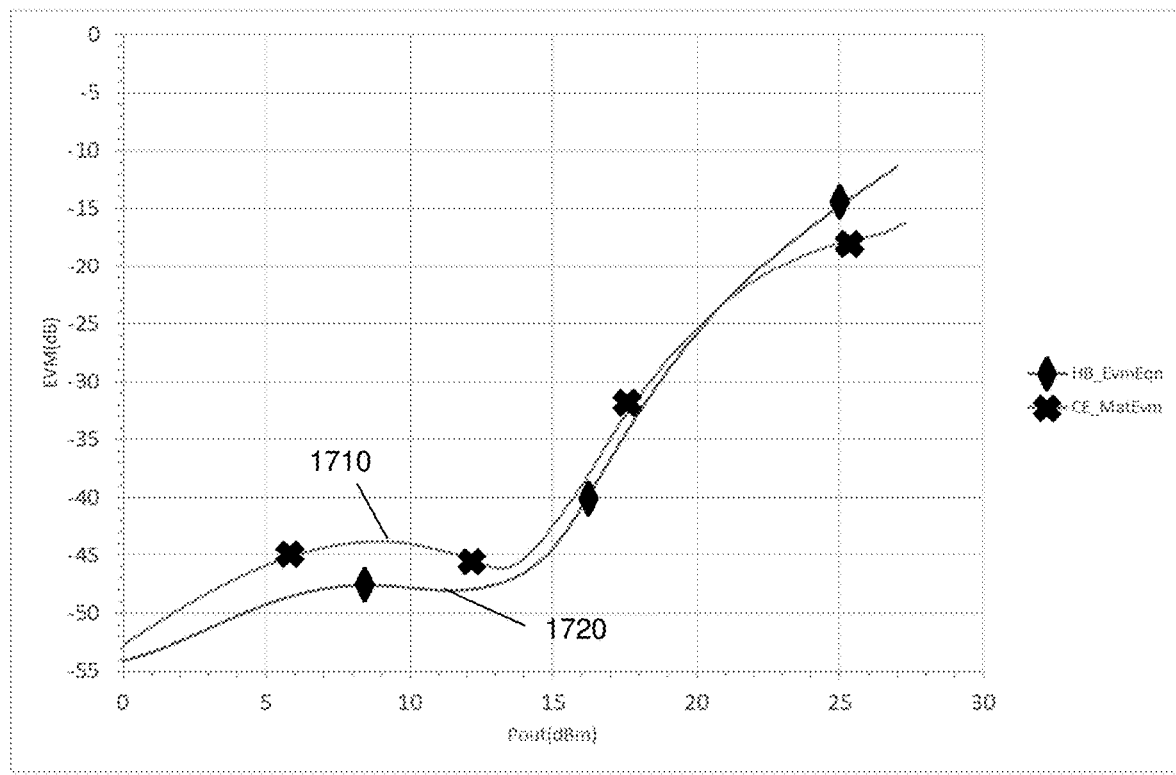
FIGS. 10A and 10B show examples of accuracy comparisons between a circuit envelope method and the present method.
Figure 10B:
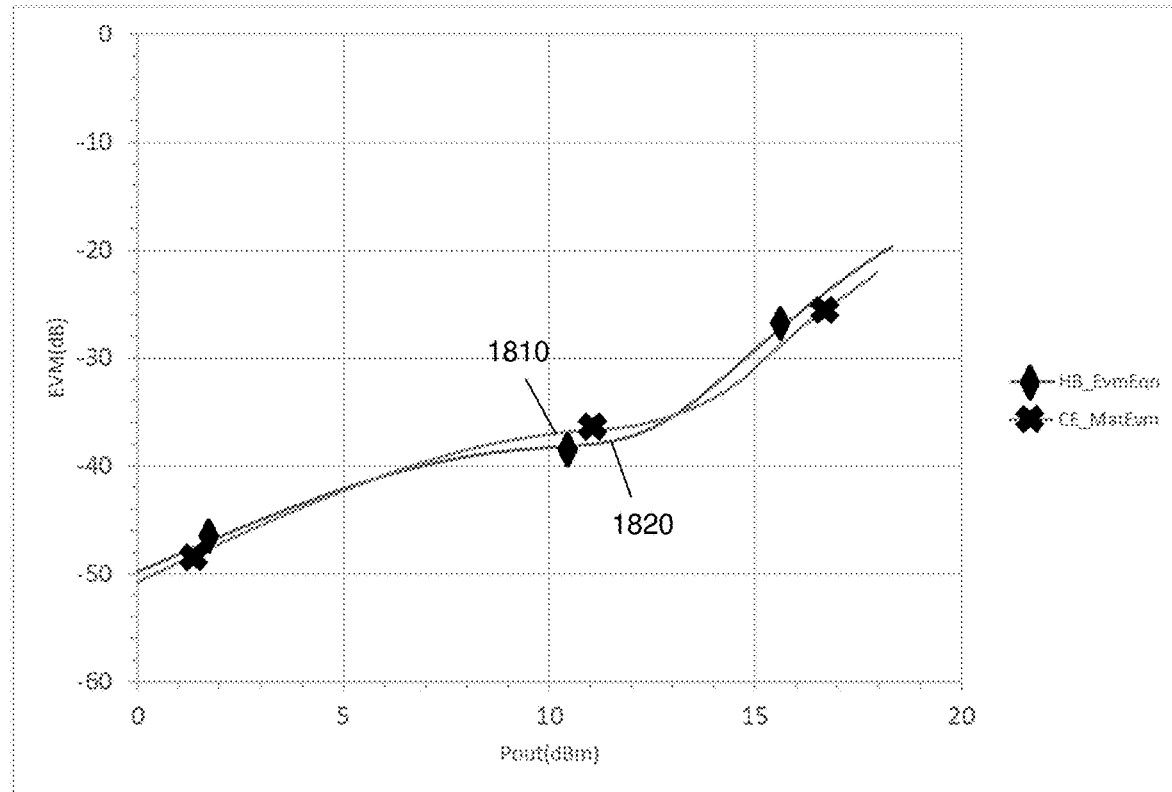

FIG. 10A shows an example accuracy (EVM values as function of output power) comparison between a circuit envelope modulated simulation with virtual spectrum analyzer demodulation in Matlab software (1710) and a simulation of the present disclosure (1720) for a simulated load impedance of 50 ohms. Note the class A-B "hump" between 0-13 dBm, and the "dip" (reduced non-linearity) at ~13 dBm. Beyond 13 dBm, compression occurs and error (EVM) power increases. This example could be for a device having an operating range of up to for example about −16 dBm for a tolerance of about −40 dB EVM. FIG. 10B shows the same comparison between a circuit envelope simulation (1810) and a simulation of the present disclosure (1820) for a complex load impedance of (17+j18) ohms. This could be, for example, for a device with a defective or interfered-with antenna such as an antenna interfered with a human hand. For both cases (standard real impedance and complex impedance), the method disclosed herein provides comparable accuracy to the much slower circuit envelope method (simulation times of approx. 1 minute compared to approx. 1 hour). The faster time obtained by the proposed method is due at least in part to the fact that it does not require modulation or demodulation, or inverse or forward FFT between IQ data symbol domain and modulated RF IQ sample domain, and to an insensitivity to convergence issues of typical traditional simulators related to compression and saturation operating states, and not requiring post-processing.

Figure 13:
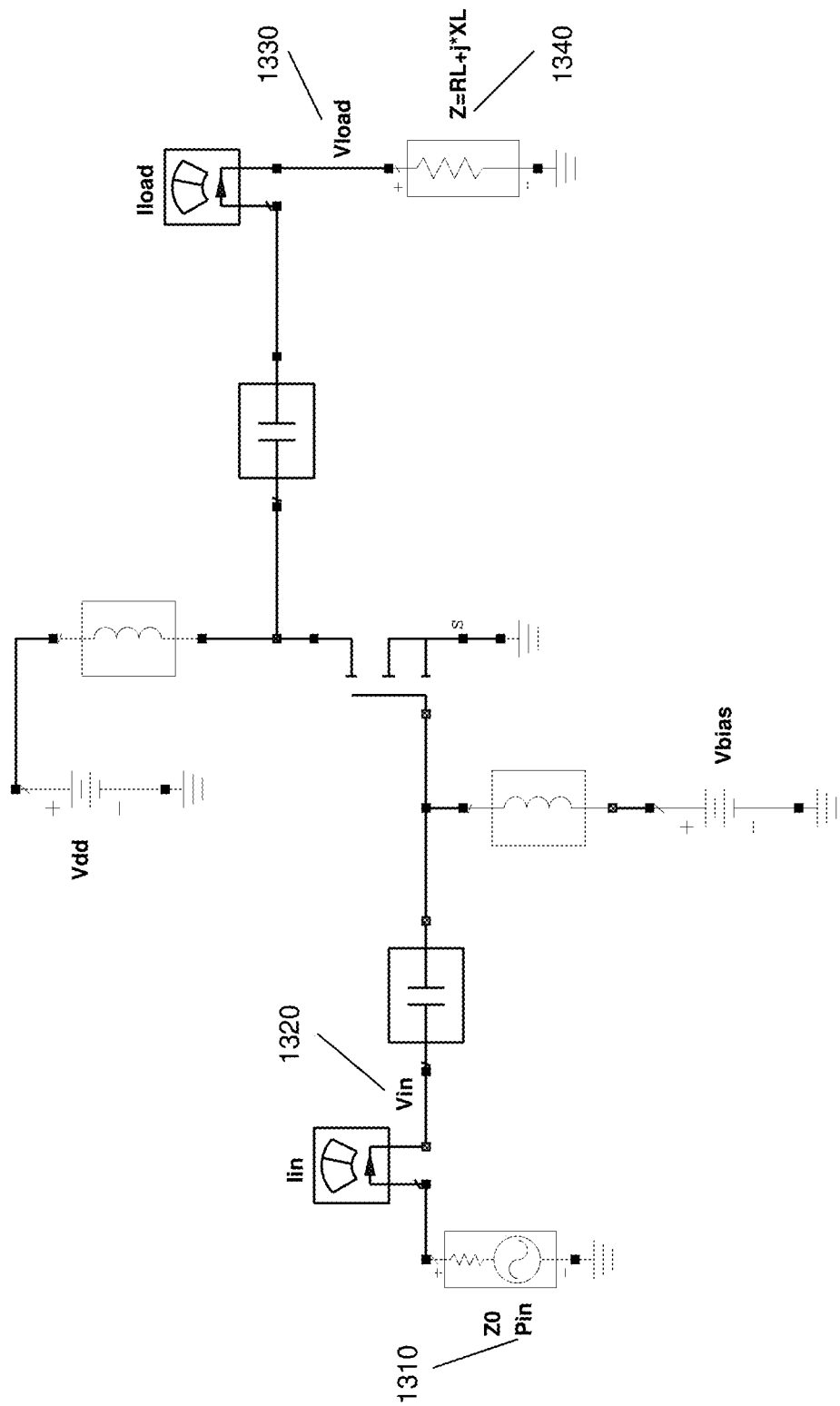
FIG. 13 shows an example circuit diagram exemplifying the relationship of input and output values described herein. Like reference numbers and designations in the various drawings indicate like elements.

FIG. 13 shows an example simplified circuit arrangement showing the relationships between the input values Pin (1310) and Vin (1320) and the output Vload (1330) and Z (1340).

Figure 9A:
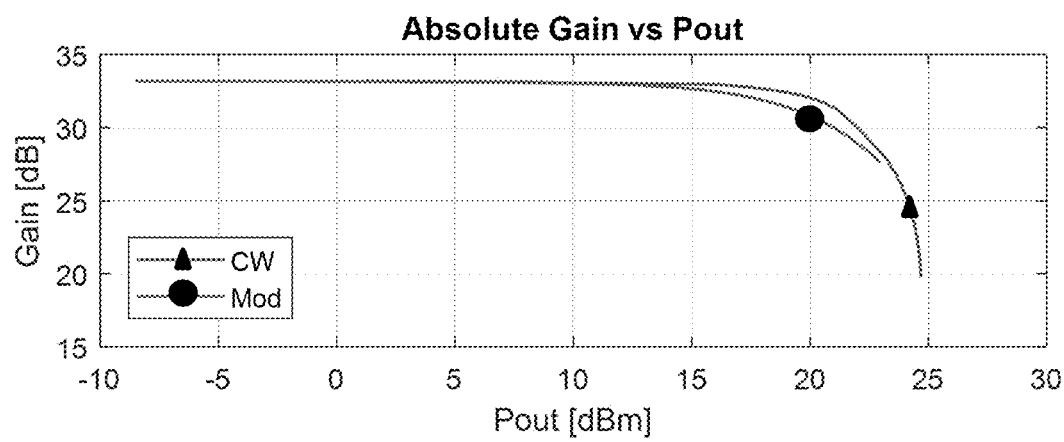
FIGS. 9A-9C show example graphs for a power amplifier simulation where Zload is 50−j50 ohms.
Figure 9B:
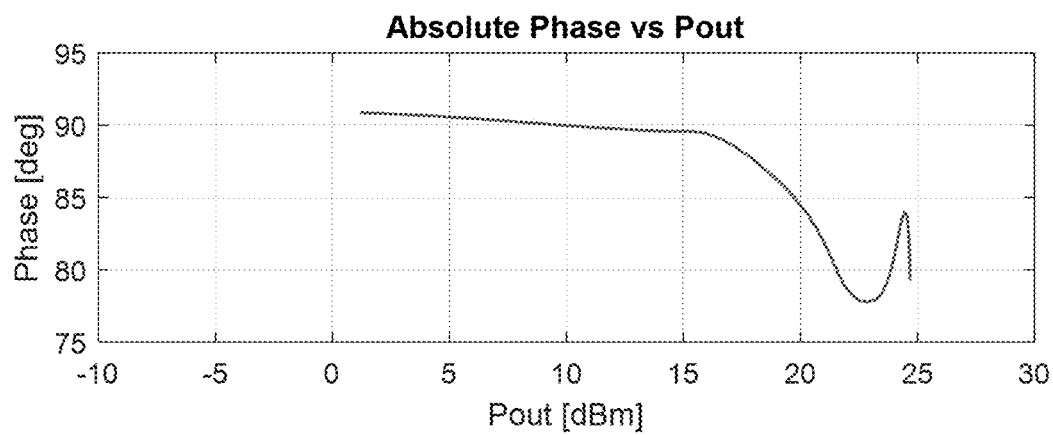
Figure 9C:
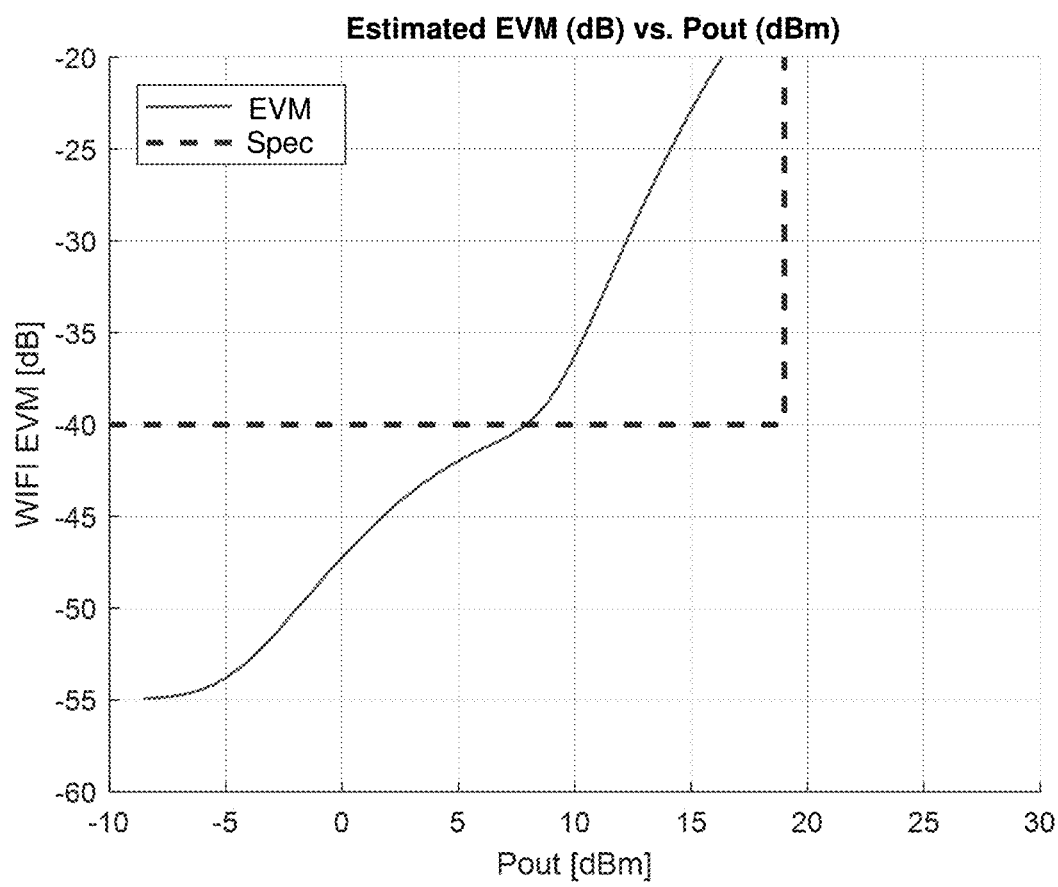

FIGS. 6A-9C show example power amplifier simulation graphs for different load impedances. FIGS. 6A-6C show an example for $Z_{LOAD}=50\Omega$. FIGS. 7A-7C show an example for $Z_{LOAD}=100\Omega$. FIGS. 8A-8C show an example for $Z_{LOAD}=50+j50\Omega$. FIGS. 9A-9C show an example for $Z_{LOAD}=50-j50\Omega$. In FIGS. 6A-9A, continuous wave (CW) AM/AM gain and modulated gain are the same for the small signal case (lower Pout values), and the modulated Pin is CW Pin minus PAPR (9.7 dB) for "backoff". FIG. 6A-6C)-(9A-9C) collectively illustrate the EVM characteristics, determined by the proposed method, of an example simulated PA and its corresponding gain and phase characteristics (AM-AM and AM-PM), and in particular "in-spec" EVM values and the corresponding gain and phase characteristics versus output power. For example, in the vicinity of output power levels where the absolute phase value deviates by a sufficient amount from its nearly constant value at lower output power levels, the corresponding EVM values become "out-of-spec", as expected. These examples illustrate that the proposed method works well for a variety of load impedance values including 50Ω and non-50Ω and thus is capable of simulating (or measuring) dynamic conditions where for example a hand on a handset is in the vicinity of the antenna connected to the power amplifier and thus effectively varying the load impedance from 50Ω.

FIG. 12 shows an example table of values from the method calculations. The first two columns are example of an array (e.g., vector) of values of input (x) and output (y) voltage values, respectively. Arrays of quantities used in summations in the calculation of the optimum value of β, β*, according to the expression specified in a previous section, are in the $3^{rd}$ and $4^{th}$ columns. Their summations are specified in the table in FIG. 12 as well as the corresponding optimum β value (−0.640+j2.384) in this example. The table shows the EVM* value calculated according to the expression specified earlier as −17.96 dB for this example.

Figure 14:
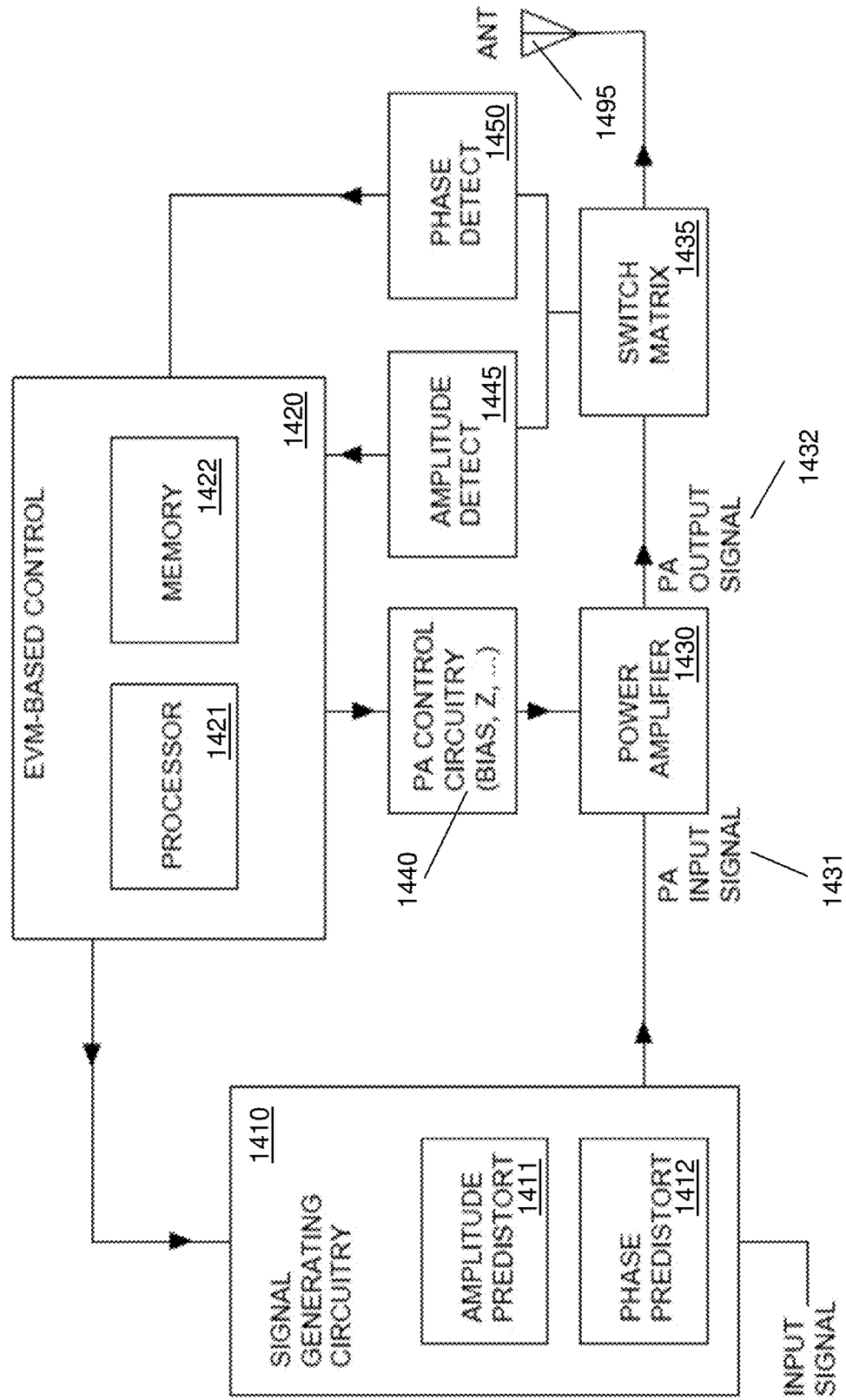
FIG. 14 shows an example of using EVM estimation for adjusting the modulation scheme.

FIG. 14 is an example block diagram showing a wireless communication device including an amplifier (1430) and an antenna (1495). In the embodiment of FIG. 14, a switch matrix (1435) is located between the amplifier (1430) and the antenna (1495). In some embodiments, the switch matrix (1435) can selectively connect the output (1432) of the amplifier (1430) to the antenna (1495). In some embodiments, the switch matrix (1435) can selectively connect the output (1432) of the amplifier (1430) to an amplitude detector (1450) and/or a phase detector (1445). The amplitude detector (1445) can provide an amplitude detect signal to the EVM-based controller (1420). The phase detector (1450) can provide a phase detect signal to the EVM-based controller (1420).

In the example of FIG. 14, the EVM-based controller (1420) provides one or more control signals to signal generating circuitry (1410). The signal generating circuitry (1410) can generate a variety of signals. The signal generating circuitry (1410) can generate, among other things, a signal having a sinusoidal waveform, a single-tone harmonic balance AM-AM/PM power sweep, and/or a signal in accordance with various radio communication standards and protocols. Examples of radio communication standards and protocols include, but is not limited to, orthogonal frequency-division multiplexing ("OFDM"), quadrature amplitude modulation ("QAM"), Code-Division Multiple Access ("CDMA"), Time-Division Multiple Access ("TDMA"), Wide Band Code Division Multiple Access ("W-CDMA"), Global System for Mobile Communications ("GSM"), Long Term Evolution ("LTE"), 5G, and WiFi (e.g., 802.11a, b, g, ac, ax), and the like.

As shown in the block diagram of FIG. 14, the signal generating circuitry (1410) receives an input signal (1405). The signal generating circuitry (1410) can generate a power amplifier input (1431) based on the input signal (1405). The amplifier (1430) can then provide a PA output signal (1432) corresponding to the PA input signal (1431). As shown in the block diagram of FIG. 14, the signal generating circuitry (1410) has an amplitude pre-distort function module (1411) and a phase pre-distort function module (1412). In some embodiments, the magnitudes of the amplitude pre-distort and the phase pre-distort are determined by the EVM-based controller (1420), having a processor (1421) and memory (1422). In some embodiments, the magnitudes of the amplitude pre-distort and the phase pre-distort are determined based on calculated and/or estimated error vector magnitude values.

The block diagram of FIG. 14 includes PA control circuitry (1440). In some embodiments, PA control circuitry (1440) provides one or more control signals and/or parameters to the amplifier. In some embodiments, one or more amplifier control signals and/or parameters are determined based on calculated and/or estimated error vector magnitude values. In some embodiments, the PA control circuitry (1440) controls the bias voltages and/or currents provided to the amplifier (1430), the supply voltages and/or currents provided to the amplifier, and/or impedance matching elements connected to the amplifier (1430).

Figure 15:
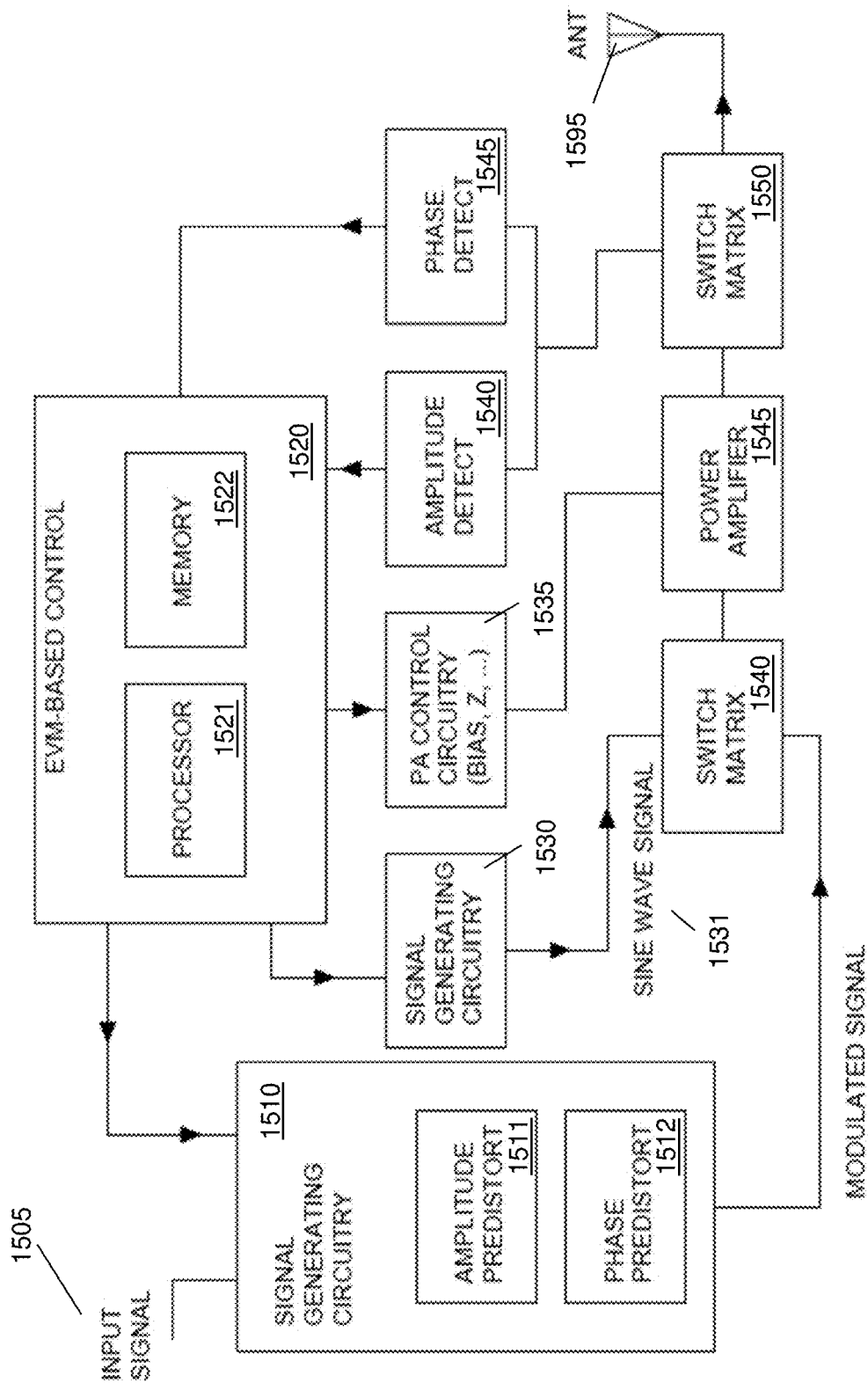
FIG. 15 shows an example of using EVM estimating for adjusting the bias on a device.

FIG. 15 is a block diagram showing a wireless communication device including first signal generating circuitry (1510) and second signal generating circuitry (1530). As shown in the block diagram of FIG. 15, the outputs of the first signal generating circuitry (1515) and the second signal generating circuitry (1531) are operatively coupled to a first switch matrix (1540). An input of an amplifier (1545) is also connected to the first switch matrix (1540). In some embodiments, the first switch matrix (1540) can selectively connect the input of the amplifier (1540) to the first signal generating circuitry (1510) and/or the second signal generating circuitry (1530). The output of the amplifier (1545) is connected to second switch matrix (1550). In some embodiments, the second switch matrix (1550) can selectively connect the output of the amplifier (1545) to an antenna (1595), an amplitude detector (1540), and/or a phase detector (1540).

With reference to FIG. 15 it will be appreciated that the wireless communication device includes an EVM-based controller (1520) having a processor (1521) and memory (1522). The EVM-based controller (1520) can provide control signals to each switch matrix (1540, 1550). The amplitude detector (1540) can provide an amplitude detect signal to the EVM-based controller (1520). The phase detector (1545) can provide a phase detect signal to the EVM-based controller (1520).

In the example of FIG. 15, the EVM-based controller (1520) provides one or more control signals to the first signal generating circuitry (1510) and the second signal generating circuitry (1530). The signal generating circuitry (1510 and 1530) can, in combination, generate a variety of signals. The signal generating circuitry can generate a signal having a sinusoidal waveform, a single-tone harmonic balance AM-AM/PM power sweep, and/or a signal in accordance with various radio communication standards and protocols (as provided for FIG. 14).

As shown in the block diagram of FIG. 15, the first signal generating circuitry (1510) receives an input signal (1505). The first signal generating circuitry (1510) can generate an output signal (1515) based on the input signal (1505), which can be provided to the amplifier (1545). As shown in the block diagram of FIG. 15, the first signal generating circuitry (1510) has an amplitude pre-distort function module (1511) and a phase pre-distort function module (1512). In some embodiments, the magnitudes of the amplitude pre-distort portion and the phase pre-distort are determined by the EVM-based controller (1520). In some embodiments, the magnitudes of the amplitude pre-distort portion and a phase pre-distort are determined based on calculated and/or estimated error vector magnitude values.

The block diagram of FIG. 15 includes PA control circuitry (1535). In some embodiments, PA control circuitry (1535) provides one or more control signals and/or parameters to the amplifier (1545). In some embodiments, one or more amplifier control signals and/or parameters are determined based on calculated and/or estimated error vector magnitude values. In some embodiments, PA control circuitry controls (1535) the bias voltages and/or currents provided to the amplifier (1545), the supply voltages and/or currents provided to the amplifier (1545), and/or impedance matching elements connected to the amplifier (1545).

With reference to the examples of FIG. 14 and FIG. 15, a wireless communication device can comprise an amplifier and signal generating circuitry operatively coupled to the input of the amplifier so that signals generated by the signal generating circuitry are received by the amplifier. In some embodiments, the wireless communication device can have circuitry operatively coupled to the signal generator and the amplifier, wherein the circuitry comprises one or more processors and a non-transitory computer readable medium (memory) storing one or more instruction sets, wherein the one or more instruction sets include instructions configured to be executed by the one or more processors to cause the device to: provide a first input signal to the amplifier, the first input signal having a plurality of input sweep amplitudes; measure a plurality of output sweep amplitudes and phase angles in a corresponding output signal produced by the amplifier; calculate a statistical distribution of the input sweep amplitudes; calculate error vector magnitude values based on the input sweep amplitudes, the output sweep amplitudes, and the statistical distribution; calculate an amplitude predistortion and a phase predistortion based on the calculated error vector magnitude values; and provide a predistorted signal to the input of the amplifier. In some embodiments, the predistorted signal can be predistorted in accordance with the calculated amplitude predistortion and the calculated phase predistortion.

With continuing reference to the examples of FIG. 14 and FIG. 15, a wireless communication device can comprise an amplifier and signal generating circuitry operatively coupled to the input of the amplifier so that signals generated by the signal generating circuitry are received by the amplifier. In some embodiments, the wireless communication device can have circuitry operatively coupled to the signal generator and the amplifier, wherein the circuitry comprises one or more processors and a non-transitory computer readable medium storing one or more instruction sets, wherein the one or more instruction sets include instructions configured to be executed by the one or more processors to cause the device to: provide a first input signal to the amplifier, the first input signal having a plurality of input sweep amplitudes; measure a plurality of output sweep amplitudes and phase angles in a corresponding output signal produced by the amplifier; calculate a statistical distribution of the input sweep amplitudes; calculate error vector magnitude values based on the input sweep amplitudes, the output sweep amplitudes, and the statistical distribution; and vary amplifier control signals and/or parameters based on the calculated error vector magnitude values.

With continuing reference to the examples of FIG. 14 and FIG. 15, a wireless communication device can comprise an amplifier and signal generating circuitry operatively coupled to the input of the amplifier so that signals generated by the signal generating circuitry are received by the amplifier. In some embodiments, the wireless communication device can have circuitry operatively coupled to the signal generator and the amplifier, wherein the circuitry comprises one or more processors and a non-transitory computer readable medium storing one or more instruction sets, wherein the one or more instruction sets include instructions configured to be executed by the one or more processors to cause the device to: provide a first input signal to the amplifier, the first input signal having a plurality of input sweep amplitudes; measure a plurality of output sweep amplitudes and phase angles in a corresponding output signal produced by the amplifier; calculate a statistical distribution of the input sweep amplitudes; calculate error vector magnitude values based on the input sweep amplitudes, the output sweep amplitudes, and the statistical distribution; select a modulation scheme based on the calculated error vector magnitude values; and provide a second signal to the input of the amplifier, the second signal being modulated in accordance with the selected modulation scheme.

With continuing reference to the examples of FIG. 14 and FIG. 15, a wireless communication device can comprise an amplifier and signal generating circuitry operatively coupled to the input of the amplifier so that signals generated by the signal generating circuitry are received by the amplifier. In some embodiments, the wireless communication device can have circuitry operatively coupled to the signal generator and the amplifier, wherein the circuitry comprises one or more processors and a non-transitory computer readable medium storing one or more instruction sets, wherein the one or more instruction sets include instructions configured to be executed by the one or more processors to cause the device to: provide a first input signal to the amplifier, the first input signal having a plurality of input sweep amplitudes; measure a plurality of output sweep amplitudes and phase angles in a corresponding output signal produced by the amplifier; calculate a statistical distribution of the input sweep amplitudes; calculate error vector magnitude values based on the input sweep amplitudes, the output sweep amplitudes, and the statistical distribution; select a peak-to-average power ratio (PAPR) based on the calculated error vector magnitude values; and provide a second signal to the input of the amplifier, the second signal having the selected PAPR.

With continuing reference to the examples of FIG. 14 and FIG. 15, a wireless communication device can comprise an amplifier and signal generating circuitry operatively coupled to the input of the amplifier so that signals generated by the signal generating circuitry are received by the amplifier. In some embodiments, the wireless communication device can have circuitry operatively coupled to the signal generator and the amplifier, wherein the circuitry comprises one or more processors and a non-transitory computer readable medium storing one or more instruction sets, wherein the one or more instruction sets include instructions configured to be executed by the one or more processors to cause the device to: provide a first input signal to the amplifier, the first input signal having a plurality of input sweep amplitudes; measure a plurality of output sweep amplitudes and phase angles in a corresponding output signal produced by the amplifier; calculate a statistical distribution of the input sweep amplitudes; calculate error vector magnitude values based on the input sweep amplitudes, the output sweep amplitudes, and the statistical distribution; select a bandwidth based on the calculated error vector magnitude values; and provide a second signal to the input of the amplifier, the second signal having the selected bandwidth.

The device under test (simulated or live) can be designed/adjusted on one or more device parameters based on the EVM results. For example, current and/or voltage bias, peak-to-peak voltage, modulation scheme, peak-to-average power ratio, bandwidth, peak power, doping profiles, gate/region thickness/geometry, power supply power (e.g., for envelope/power tracking), etc.

Figure 16:
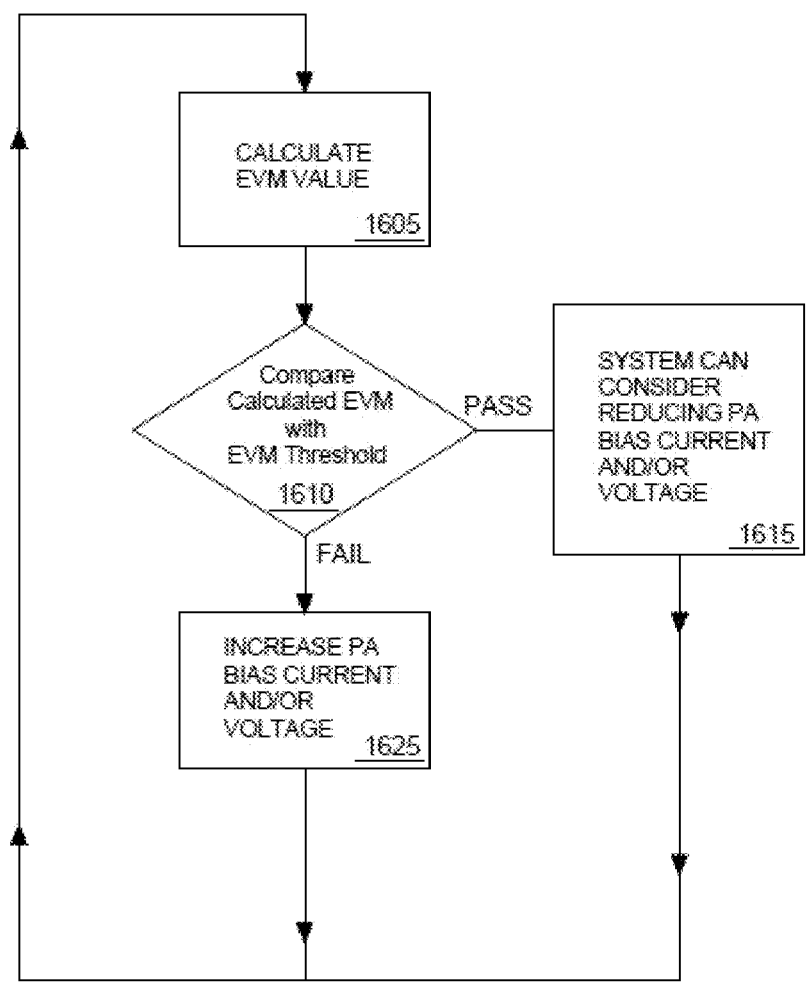
FIG. 16 shows an example of setting the bias of a device.

FIG. 16 shows an example of setting the bias of a device (e.g., the bias current flowing through an amplifier and/or the bias voltage on an amplifier). The device is tested under sweep input values (amplitudes and phase angles) at a given bias and the EVM is calculated (1605) (based on a calculated statistical distribution of input sweep amplitudes, on input sweep amplitudes, and on output amplitudes). The EVM is compared to the threshold (1610) and if it fails EVM testing (EVM crosses the threshold zone), then the bias is reduced (1615) and the test can be repeated. If it passes EVM testing (EVM does not cross the threshold zone) then the bias is increased (1625) and the test is repeated. If it passes EVM testing to satisfaction (e.g., a highest passing value, in this case bias, is found), the test can end, or can be repeated for other parameters.

Figure 17:
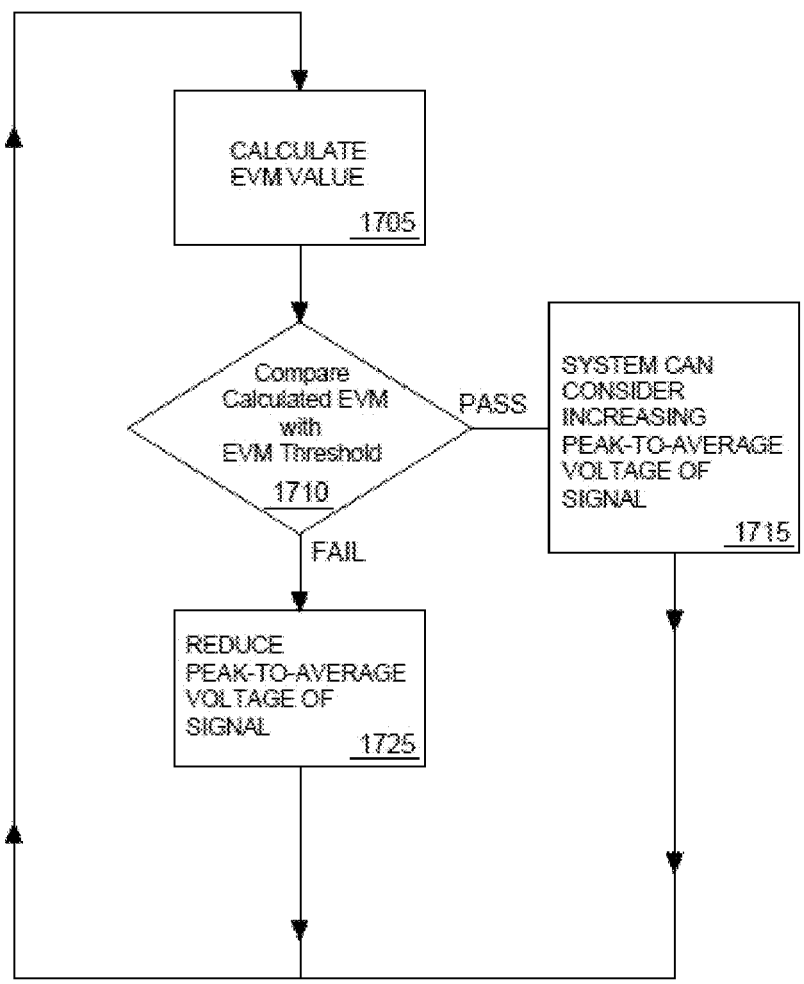
FIG. 17 shows an example of setting the peak-to-peak voltage of a device.

FIG. 17 shows an example of setting the peak-to-peak voltage of a signal provided to a device (e.g., an amplifier). The device is tested under sweep input values at a given peak to peak voltage (P2P) and the EVM is calculated (1705) (as described for FIG. 16). The EVM is compared to the threshold (1710) and if it fails, then the P2P is reduced (1715) and the test is repeated. If it passes, then the P2P is increased (1725) and the test is repeated. If it passes to satisfaction, the test can end, or can be repeated for other parameters.

Figure 18:
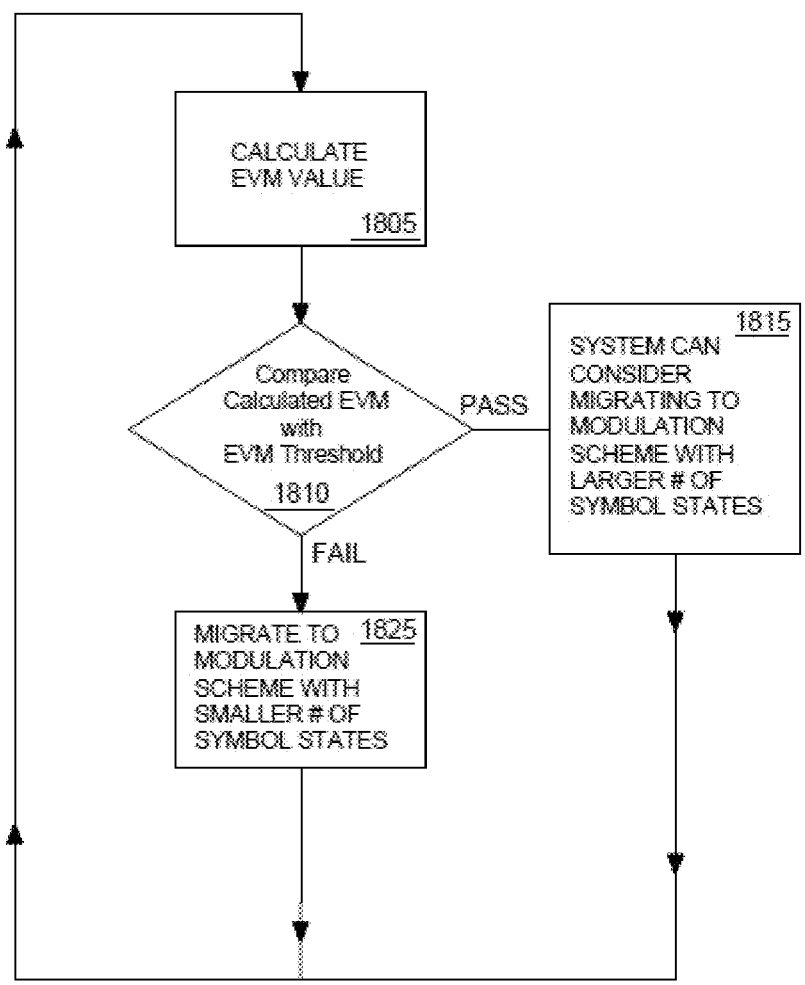
FIG. 18 shows an example of setting the modulation scheme complexity of a device.

FIG. 18 shows an example of setting the modulation scheme complexity of a signal provided to the input of a device (e.g., an amplifier). The device is tested under sweep input values at a given modulation scheme and the EVM is calculated (1805) (as described for FIG. 16). The EVM is compared to the threshold (1810) and if it fails, then the modulation complexity (number of symbol states) is reduced (1815) and the test is repeated. If it passes, then the modulation complexity is increased (1825) and the test is repeated. If it passes to satisfaction, the test can end, or can be repeated for other parameters.

Figure 19:
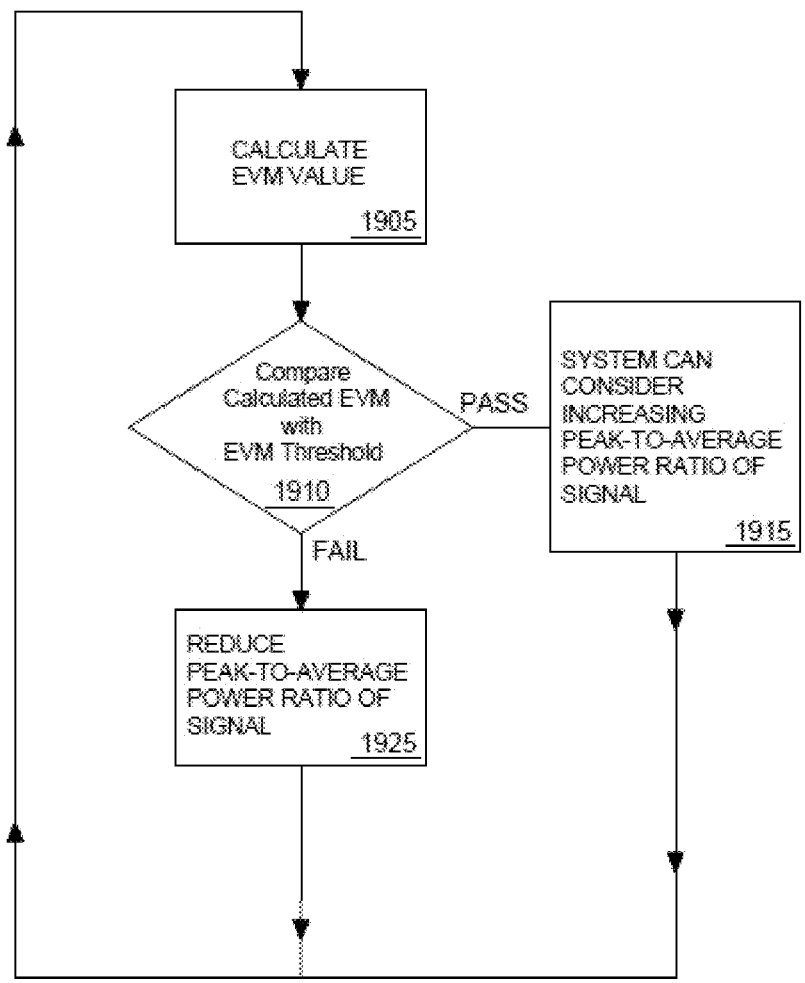
FIG. 19 shows an example of setting the modulation scheme peak-to-average power ratio of a device.

FIG. 19 shows an example of setting the modulation scheme peak-to-average power ratio (PAPR) of a signal provided to the input of a device (e.g., an amplifier). The device is tested under sweep input values at a given PAPR and the EVM is calculated (1905) (as described for FIG. 16). The EVM is compared to the threshold (1910) and if fails, then the PAPR is reduced (1915) and the test is repeated. If it passes, then the PAPR is increased (1925) and the test is repeated. If it passes to satisfaction, the test can end, or can be repeated for other parameters.

Figure 20:
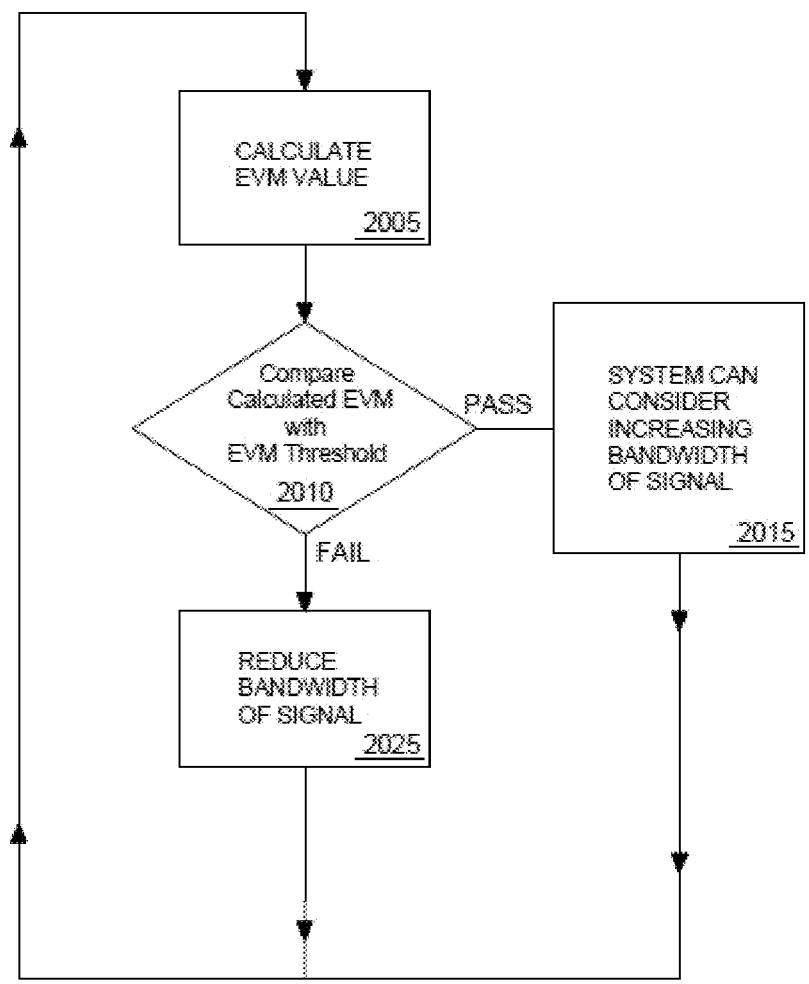
FIG. 20 shows an example of setting the signal bandwidth of a device.
Figure 21A:
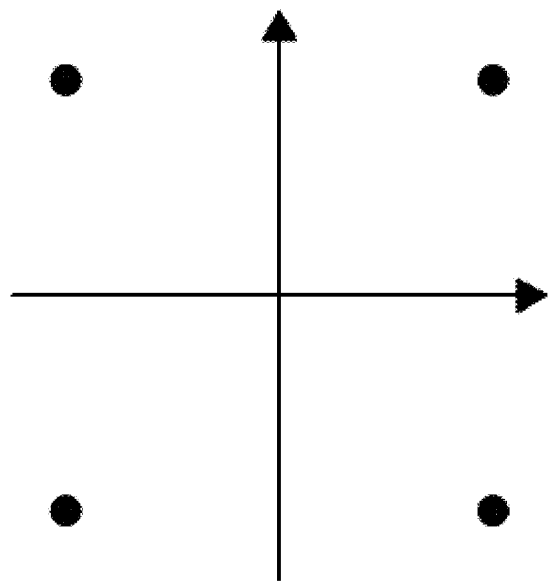
FIGS. 21A-21C show example constellation diagrams for some modulation schemes used by RF devices.
Figure 21B:
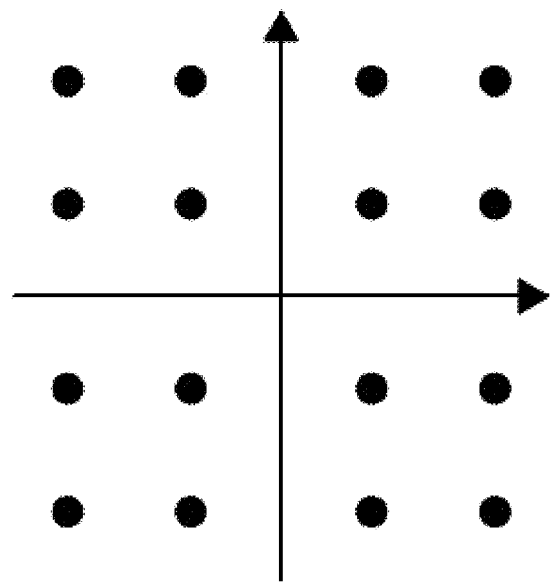
Figure 21C:
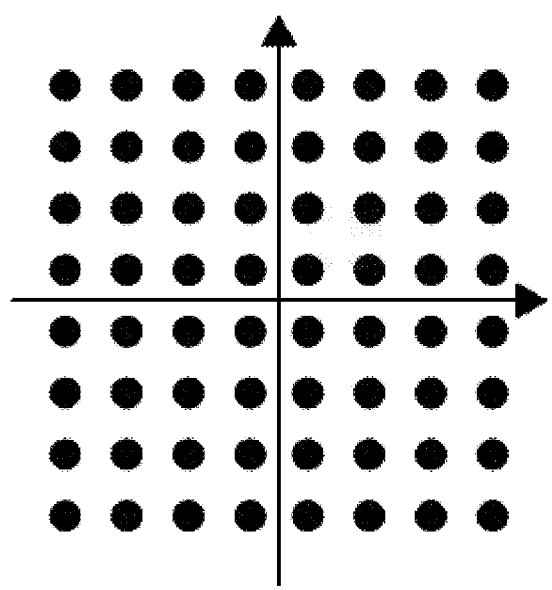

FIG. 20 shows an example of setting the bandwidth of a signal provided to a device (e.g., an amplifier). The device is tested under sweep input values at a given bandwidth and the EVM is calculated (2005) (as described for FIG. 16). The EVM is compared to the threshold (2010) and if it fails, then the bandwidth is increased (2015) and the test is repeated. If it is not less than the minimum, but greater than a maximum threshold (2020), then the bandwidth is increased (2025) and the test is repeated. If it is less than the maximum threshold, the test ends, or can be repeated for other parameters.

Figure 22A:
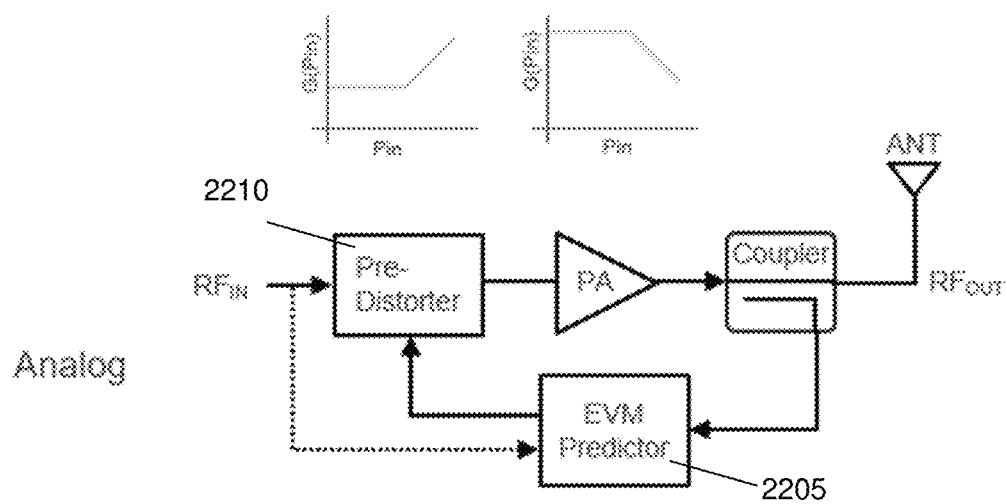
FIGS. 22A and 22B show example diagrams of using EVM prediction to adjust pre-distortion for the RF device
Figure 22B:
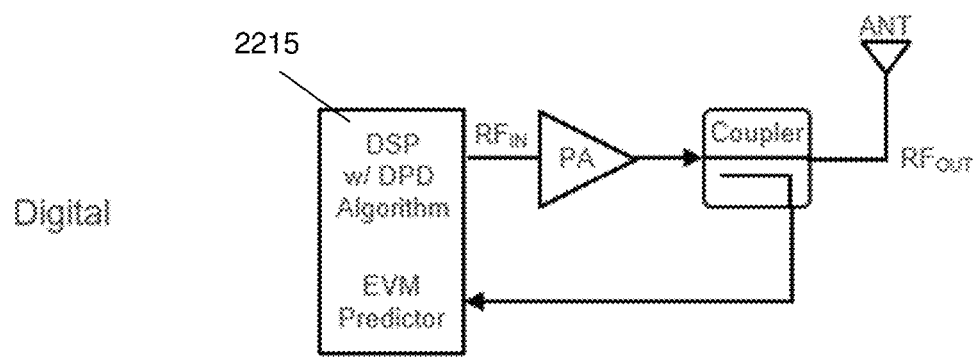

FIGS. 22A and 22B show example diagrams of using EVM prediction to adjust pre-distortion for the RF device (here shown as a power amplifier). In FIG. 22A, an analog example is shown, with the EVM predictor (2205) feeding back into the pre-distorter (2210) to adjust pre-distortion for the RF device. In FIG. 22B, a digital example is provided, with the digital signal processor (DSP) having digital pre-distortion (DPD) capability (2215) include an EVM predictor module, adjusting pre-distortion for the RF device. These pre-distortion adjustments can be a first-order correction, for example.

Figure 23:
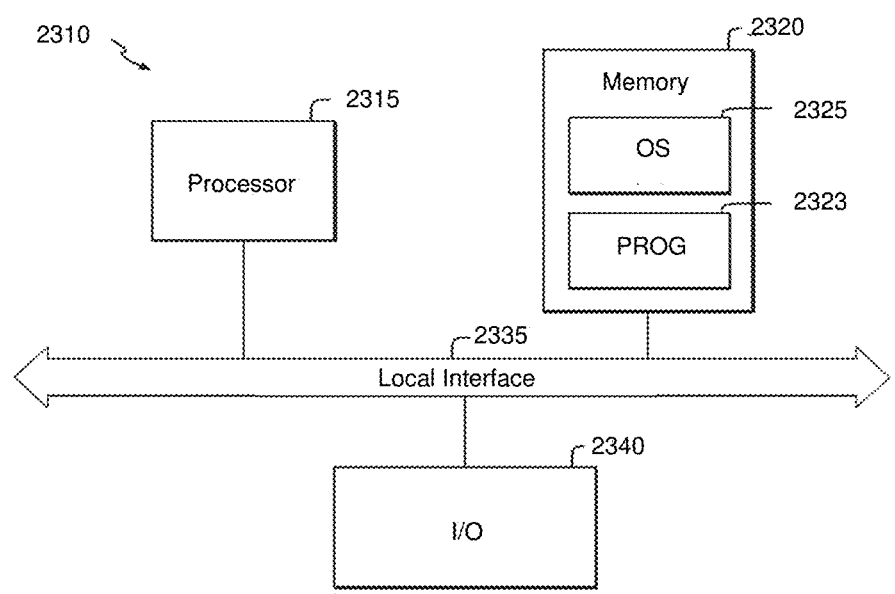
FIG. 23 shows an exemplary embodiment of a target hardware for implementing the methods described herein.

FIG. 23 is an exemplary embodiment of a target hardware (2310) (e.g., a computer system) for implementing the embodiment of FIGS. 3-22 and 25. This target hardware comprises a processor (2315), a memory bank (2320), a local interface bus (2335) and one or more Input/Output devices (2340). The processor may execute one or more instructions related to the implementation of FIGS. 3-22 and 25 and as provided by the Operating System (2325) based on some executable program (2330) stored in the memory (2320). These instructions are carried to the processor (2315) via the local interface (2335) and as dictated by some data interface protocol specific to the local interface and the processor (2315). It should be noted that the local interface (2335) is a symbolic representation of several elements such as controllers, buffers (caches), drivers, repeaters and receivers that are generally directed at providing address, control, and/or data connections between multiple elements of a processor-based system. In some embodiments, the processor (2315) may be fitted with some local memory (cache) where it can store some of the instructions to be performed for some added execution speed. Execution of the instructions by the processor may require usage of some input/output device (2340), such as inputting data from a file stored on a hard disk, inputting commands from a keyboard, inputting data and/or commands from a touchscreen, outputting data to a display, or outputting data to a USB flash drive. In some embodiments, the operating system (2325) facilitates these tasks by being the central element to gathering the various data and instructions required for the execution of the program and provide these to the microprocessor. In some embodiments, the operating system may not exist, and all the tasks are under direct control of the processor (2315), although the basic architecture of the target hardware device (2310) will remain the same as depicted in FIG. 23. In some embodiments, a plurality of processors may be used in a parallel configuration for added execution speed. In such a case, the executable program may be specifically tailored to a parallel execution. Also, in some embodiments the processor (2315) may execute part of the implementation of FIGS. 3-22 and 25 and some other part may be implemented using dedicated hardware/firmware placed at an Input/Output location accessible by the target hardware (2310) via local interface (2335). The target hardware (2310) may include a plurality of executable programs (2330), wherein each may run independently or in combination with one another. The software can be stored on non-transient storage media, such as on a disc, in flash memory, random access memory (RAM), solid-state drives (SSDs), or the like.

Figure 24:
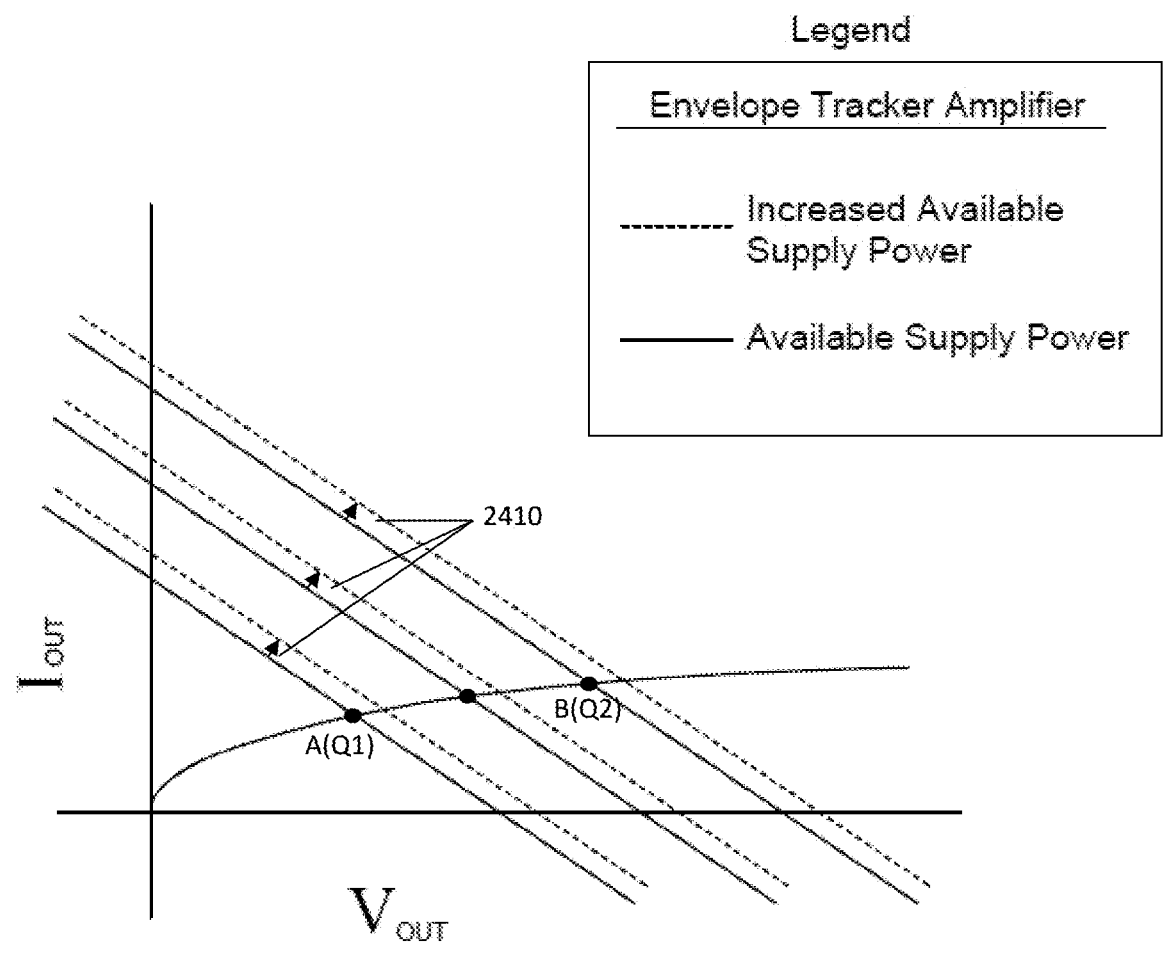
FIG. 24 shows an exemplary graph for envelope tracking.

FIG. 24 shows an example graph related to an envelope tracking application. Envelope tracking may include following the real time envelope of the signal with a tracking amplifier. In some example embodiments, an EVM-based controller may be used to selectively modify the gain, power, supply voltage, and/supply current of an envelope tracking amplifier. Changing both the supply voltage and the supply current may be viewed as modifying the supply power of the amplifier. The dashed lines in the example graph of FIG. 24 illustrate example increased supply powers that may be selectively made available to a tracking amplifier by an EVM-based controller.

The slope of the current-to-voltage curves in the graph of FIG. 24 illustrate the operating load line of an example envelope tracking amplifier. In some example embodiments, an EVM-based controller can be used to selectively modify the operating load line of an envelope tracking amplifier. In some example embodiments, an EVM-based controller can be used to selectively modify the slew rate of an envelope tracking amplifier. In some example embodiments, an EVM-based controller can be used to selectively modify the gain of an envelope tracking amplifier. In some example embodiments, an EVM-based controller can be used to selectively modify the RF PA capacitance of an envelope tracking amplifier. In some example embodiments, an EVM-based controller can be used to selectively modify the voltage supply to an envelope tracking amplifier.

Figure 25:
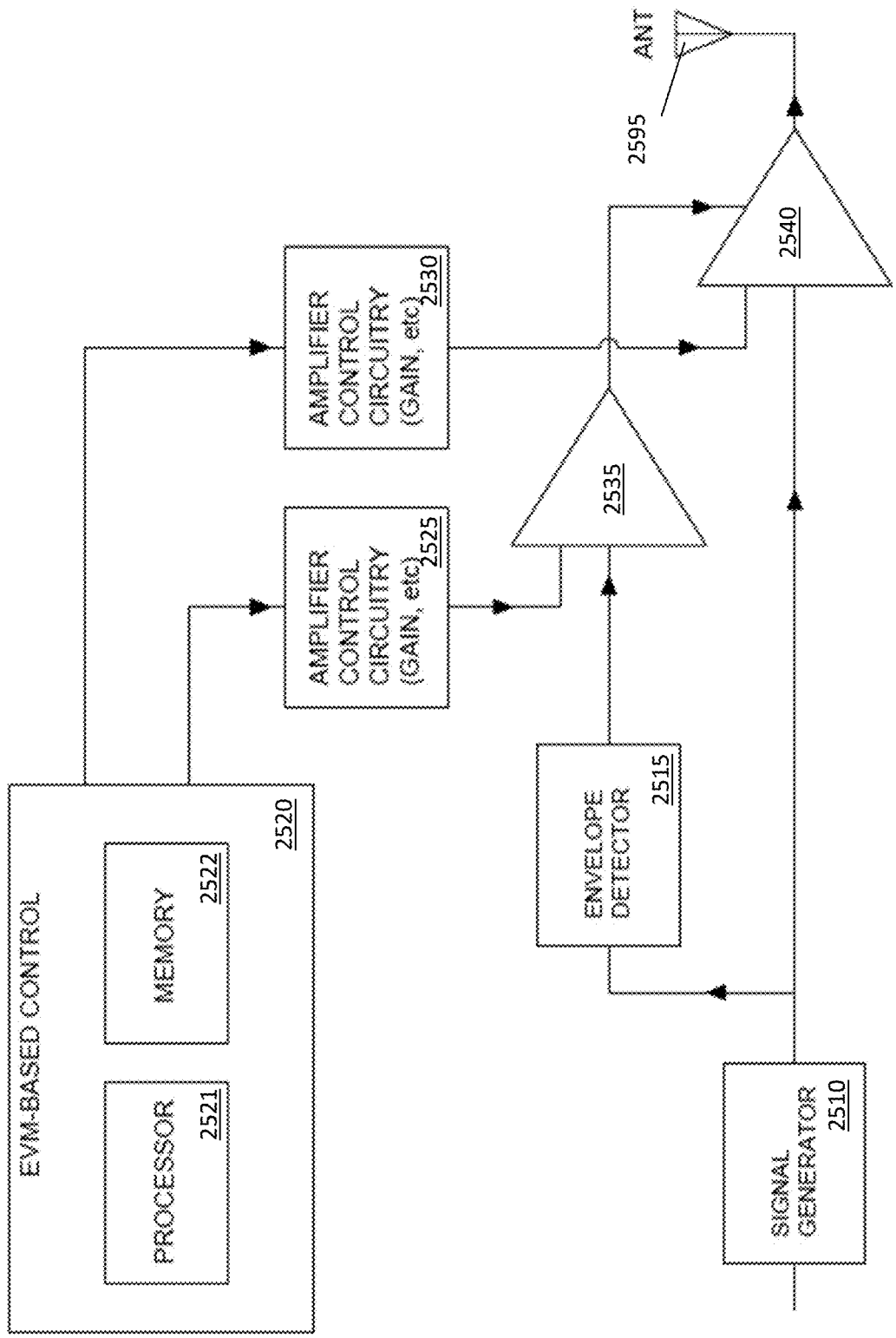
FIG. 25 shows an example of adjusting envelope tracking of a device.

FIG. 25 is a stylized block diagram showing a wireless communication device including a first amplifier (2535), a second amplifier (2540), and an antenna (2595). The wireless communication device of FIG. 25 also includes a signal generator (2510) and an envelope detector (2515). Envelope tracking may include following the real time envelope of the signal with a tracking amplifier. In some example embodiments, an EVM-based controller (2520), having a processor (2521) and memory (2522), and amplifier control circuitry (2525, 2530) may be used to selectively modify the gain, power, supply voltage, and/or supply current of the tracking amplifiers (2535, 2540). Changing both the supply voltage and the supply current may be viewed as modifying the supply power of the amplifiers (2535,2540).

As should be readily apparent to one of ordinary skill in the art, various embodiments of the invention can be implemented to meet a wide variety of specifications. Unless otherwise noted above, selection of suitable component values is a matter of design choice and various embodiments of the invention may be implemented in any suitable telecom technology.

Conclusion

The examples set forth above are provided to give those of ordinary skill in the art a complete disclosure and description of how to make and use the embodiments of the error vector magnitude prediction of the disclosure and are not intended to limit the scope of what the inventors regard as their disclosure. Such embodiments may be, for example, used in the designing and testing of various RF devices, such as transmitters, amplifiers, transistors, etc. The skilled person may find other suitable implementations of the presented embodiments.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion.

It is to be understood that the disclosure is not limited to particular methods or systems, which can, of course, vary. It is also to be understood that the terminology used herein is for the purpose of describing particular embodiments only and is not intended to be limiting. As used in this specification and the appended claims, the singular forms "a", "an", and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains. The term "about" refers to being within a 3% margin.

It is to be understood that the foregoing description is intended to illustrate and not to limit the scope of the invention, which is defined by the scope of the following claims, and that other embodiments are within the scope of the claims. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence.)

What is claimed is:

1. A computer-implemented method for designing an RF device, comprising:
   modelling a current design of the RF device as a model device in a simulator;
   applying a simulated input power sweep on the model device;
   measuring, by a processor, an output sweep of amplitudes for the model device in response to the simulated input power sweep;
   calculating, by a processor, a parameter of a statistical distribution based on a modulation scheme for the RF device;
   computing, by a processor, error vector magnitude values versus output power based on the input sweep, output sweep, and the statistical distribution, wherein the statistical distribution provides a matrix of weighting factors for the computing of the error vector magnitude values;
   determining, by a processor, if the RF device is within a specified tolerance based on the error vector magnitude values; and
   adjusting the current design of the RF device based on the determining.

2. The method of claims 1, wherein the applying the simulated input power sweep provides a continuous wave single-tone voltage sweep.

3. The method of claim 1, wherein the RF device is an amplifier.

4. The method of claim 3, wherein the amplifier is a power amplifier.

5. The method of claim 1, further comprising setting a peak-to-average power ratio (PAPR), wherein the statistical distribution has a mean value proportional to the PAPR.

6. The method of claim 1, wherein the error vector magnitude values are computed in dBm.

7. The method of claim 1, wherein the determining the statistical distribution further comprises:
   fitting a histogram of amplitudes of IQ samples.

8. The method of claim 1, wherein the statistical distribution is a Rayleigh distribution.

9. The method of claim 1, wherein the RF modulation is OFDM according to a WiFi standard.

10. The method of claim 1, wherein adjusting includes changing at least one parameter based on the determining.

11. The method of claim 10, wherein the at least one parameter is at least one of current bias, voltage bias, peak-to-peak voltage, modulation scheme, peak-to-average power ratio, and signal bandwidth.

12. A system configured to carry out the steps of claim 1, the system comprising memory and at least one processor connected to the memory.

13. A non-transient computer readable medium containing data that, when read by a computer, carry out the steps of claim 1.

14. The method of claim 1, wherein the error vector magnitude values are also based on a predetermined floor value.

15. A method, comprising:
   applying an input power sweep on an RF device;
   measuring an output sweep of amplitudes on the RF device;
   calculating, by a processor, a statistical distribution of the input sweep;

computing, by a processor, error vector magnitude values based on the input sweep, output sweep, and statistical distribution, wherein the statistical distribution provides a matrix of weighting factors for the computing of the error vector magnitude values;

determining, by a processor, if the RF device is within a specified tolerance based on the error vector magnitude values; and adjusting the RF device based on the determining.

16. The method of claim 15, wherein the applying an input sweep provides a continuous wave single-tone voltage sweep.

17. The method of claim 15, further comprising setting a peak-to-average power ratio (PAPR), wherein the statistical distribution has a mean value proportional to the PAPR.

18. The method of claim 15, wherein the error vector magnitude values are computed in dBm.

19. The method of claim 15, wherein adjusting includes changing at least one parameter based on the determining.

20. The method of claim 19, wherein the at least one parameter is at least one of amplifier bias current, amplifier bias voltage, amplifier supply voltage, amplifier supply current peak-to-peak voltage of a signal transmitted by the RF device, modulation scheme of a signal transmitted by the RF device, the peak-to-average power ratio of a signal transmitted by the RF device, and bandwidth of a signal transmitted by the device.

21. A system comprising:
an RF device;
an EVM predictor configured to perform the method of claim 15 on the RF device;
a pre-distorter controlled by the EVM predictor and connected to the RF device, the EVM predictor adjusting pre-distortion for the RF device.

22. A system comprising:
an RF device;
a digital signal processor connected to the RF device, the digital signal processor including digital pre-distortion capability and including a EVM prediction module configured to perform the method of claim 15 on the RF device, the EVM predictor module adjusting pre-distortion for the RF device.

23. A computer-implemented method for designing an RF device, comprising:
modelling a current design of the RF device as a model device in a simulator;
applying a simulated input power sweep on the model device;
measuring, by a processor, an output sweep of amplitudes for the model device in response to the simulated input power sweep;
calculating a distorted IQ data based on the output sweep of amplitudes;
calculating, by a processor, a parameter of a statistical distribution based on a modulation scheme for the RF device;
computing, by a processor, error vector magnitude values versus output power based on the input sweep, output sweep, the statistical distribution, and a scaling factor determined based on a linear least-squares fit between an ideal IQ data and the distorted IQ data and
determining, by a processor, if the RF device is within a specified tolerance based on the error vector magnitude values.

24. The computer-implemented method of claim 23 wherein summation terms in error vector magnitude are weighted by elements of a weighting matrix to account for high peak-to-average values of the output sweep of amplitudes.

* * * * *